(12) United States Patent
Tao et al.

(10) Patent No.: US 11,057,621 B2
(45) Date of Patent: Jul. 6, 2021

(54) ENCODING METHOD, DECODING METHOD AND DEVICE THEREOF

(71) Applicant: Tsinghua University, Beijing (CN)

(72) Inventors: Pin Tao, Beijing (CN); Lixin Feng, Beijing (CN); Zheng Wang, Beijing (CN)

(73) Assignee: Tsinghua University, Beijing (CN)

( * ) Notice: Subject to any disclaimer, the term of this patent is extended or adjusted under 35 U.S.C. 154(b) by 39 days.

(21) Appl. No.: 16/531,513

(22) Filed: Aug. 5, 2019

(65) Prior Publication Data

US 2019/0356914 A1 Nov. 21, 2019

Related U.S. Application Data

(63) Continuation of application No. 15/579,000, filed as application No. PCT/CN2015/080753 on Jun. 4, 2015, now Pat. No. 10,375,391.

(51) Int. Cl.
*H04N 19/11* (2014.01)
*H04N 19/61* (2014.01)
(Continued)

(52) U.S. Cl.
CPC ........... *H04N 19/11* (2014.11); *H04N 19/124* (2014.11); *H04N 19/13* (2014.11); *H04N 19/14* (2014.11);
(Continued)

(58) Field of Classification Search
None
See application file for complete search history.

(56) References Cited

U.S. PATENT DOCUMENTS

2004/0028280 A1* 2/2004 Greene ............... G06K 9/6297
382/229
2011/0268185 A1 11/2011 Watanabe et al.
(Continued)

FOREIGN PATENT DOCUMENTS

| CN | 103004199 A | 3/2013 |
| CN | 103248885 A | 8/2013 |
| JP | 2006217339 A | 8/2006 |

OTHER PUBLICATIONS

Thiow Keng Tan, Choong Seng Boon and Yoshinori Suzuki, "Intra Prediction By Template Matching", 2006 International Conference on Image Processing (Year: 2006).*

(Continued)

*Primary Examiner* — Xiaolan Xu
(74) *Attorney, Agent, or Firm* — Olive Law Group, PLLC

(57) ABSTRACT

An image encoding method, decoding method and corresponding device, and intraframe pixel prediction method. The image encoding method comprises: a step of pixel segmentation, segmenting pixels in an image frame; a step of pixel value prediction, respectively performing a pixel value prediction process to obtain a first prediction value for each of pixels in a current block to be encoded; a step of residual calculation, calculating a residual for each of the pixels in the current block to be encoded; a step of discrete cosine transform, quantization and entropy encoding, performing discrete cosine transform, quantization and entropy encoding with respect to a residual block corresponding to the current block to be encoded obtained in the residual calculation step, wherein the quantized residual block is used in a pixel value reconstruction step at an encoding end, and the entropy encoded residual block is sent to a decoding end; and a pixel value reconstruction step, reconstructing a pixel value of the previously-encoded pixel, wherein the (Continued)

re-constructed pixel value is used in the pixel value prediction step. The residual calculation step comprises: calculating a first residual with respect to a pixel on the basis of the first prediction value of the pixel predicted in the pixel value prediction step and an actual value of the pixel; determining whether the first residual of the pixel is a normal residual or an abnormal residual; correcting the abnormal residual if the first residual of the pixel is an abnormal residual, the correction including recording a position of which the abnormal residual of the pixel has occurred; re-predicting the pixel to obtain a second prediction value and a corresponding second residual, and recording the re-prediction information, such that the pixel value reconstruction step of the encoding end and the decoding end can both reconstruct and decode the pixel value of the pixel on the basis of the position of which the abnormal residual of the pixel has occurred and the re-prediction information, wherein the normal residual block of the current block is formed by the residual of the pixel of the current block to be encoded after undergoing the abnormal residual correction, and is provided for further processing in the discrete cosine transform, quantization and entropy encoding step; separately encoding the position of which the abnormal residual of the pixel has occurred and the re-prediction information, wherein the encoding process is lossless, and the encoded pixel position and the re-prediction information are used in the pixel value reconstruction step and sent to the decoding end. Pixels can be re-arranged before segmentation, thereby avoiding error diffusion. In the pixel value prediction process, a prediction algorithm can be predicted first, and the pixel value is then predicted according to the determined prediction algorithm. By classifying the pixel residual into the normal residual and the abnormal residual, as well as by performing a re-prediction of the pixel of the abnormal residual, the accuracy of image encoding/decoding can be improved.

16 Claims, 13 Drawing Sheets

(51) Int. Cl.
| | | |
|---|---|---|
| *H04N 19/86* | (2014.01) |
| *H04N 19/14* | (2014.01) |
| *H04N 19/124* | (2014.01) |
| *H04N 19/13* | (2014.01) |
| *H04N 19/182* | (2014.01) |
| *H04N 19/91* | (2014.01) |

(52) U.S. Cl.
CPC ............ *H04N 19/182* (2014.11); *H04N 19/61* (2014.11); *H04N 19/86* (2014.11); *H04N 19/91* (2014.11)

(56) References Cited

U.S. PATENT DOCUMENTS

| | | |
|---|---|---|
| 2012/0014432 A1 | 1/2012 | Watanabe et al. |
| 2015/0016523 A1 | 1/2015 | Puri et al. |
| 2015/0245068 A1 | 8/2015 | Kim et al. |
| 2015/0373379 A1 | 12/2015 | Chandrashekar et al. |

OTHER PUBLICATIONS

Akihiro Uchida, Yasuaki Ito, and Koji Nakano, "Fast and Accurate Template Matching Using Pixel Rearrangement on the GPU", 2011 Second International Conference on Networking and Computing (Year: 2011).*

Chinese International Search Report issued in PCT Application No. PCT/CN2015/080753 dated Mar. 3, 2016, with English translation (ten (10) pages).

Chinese-language Written Opinion issued in PCT Application No. PCT/CN2015/080753 dated Mar. 3, 2016 (four (4) pages).

* cited by examiner

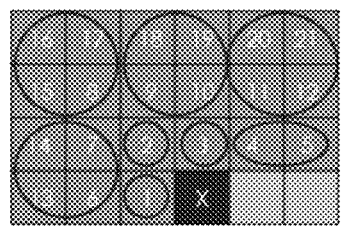
FIG. 11
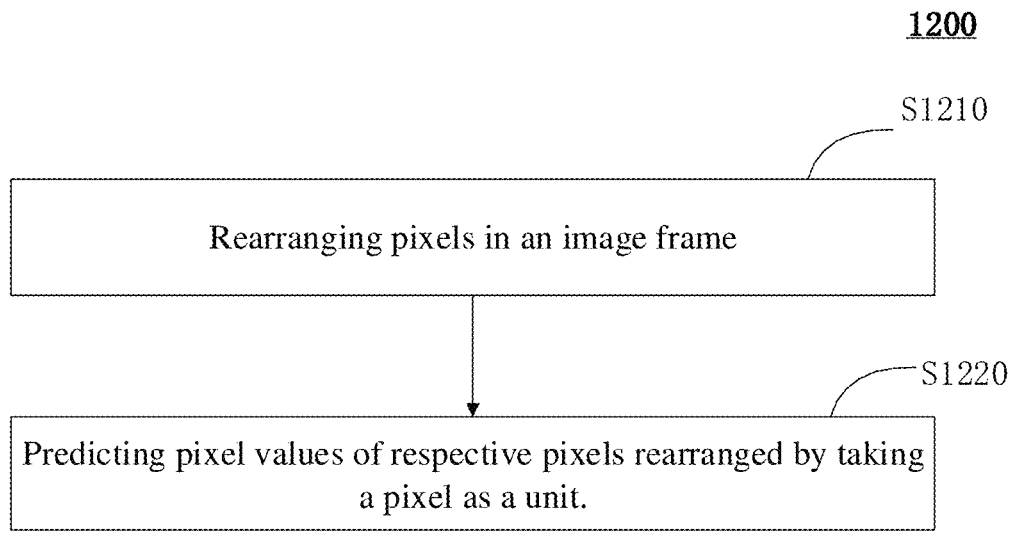
FIG. 12
FIG. 13

Neighbor CU　　　　　Current CU　　　Neighbor CU & Current CU
　　　　　　　　　　　　　　　　　　non-residual zero position matchup
(a)　　　　　　　　　(b)　　　　　　　　　　(c)

ENCODING METHOD, DECODING METHOD AND DEVICE THEREOF

CROSS REFERENCE TO RELATED APPLICATIONS

This application is a continuation patent application of U.S. patent application Ser. No. 15/579,000, filed Dec. 1, 2017, which is a 35 USC 371 application of International PCT Patent Application No. PCT/CN2015/080753, filed on Jun. 4, 2015; the contents of which are hereby incorporated by reference herein in their entireties.

TECHNICAL FIELD

The present invention generally relates to an image encoding and decoding technology, in particular to an intraframe pixel prediction method, an image encoding method, and an image decoding method, and a device.

BACKGROUND

Video compression technology is widely used in various products, such as digital set-top boxes (STB), High-Definition TV (HDTV) decoders, digital video disc (DVD) players, digital cameras, network multimedia video applications etc. There are various video encoding methods for compressing digital video content. There are already many video compression standards to standardize the various video encoding methods. Examples of these standards include MPEG-1, MPEG-2 (ITU-T H.262), MPEG-4, ITU-T H.261, ITU-T H.263 and ITU-T H.264.

Video encoding standards such as MPEG standards and the like generally implement data compression through use of various encoding techniques such as time and space prediction, transform and quantization, entropy encoding or the like. Compression in a video encoder typically includes inter-frame prediction and intraframe prediction to improve encoding efficiency. Inter-frame prediction uses time correlation between images of a video, while intraframe prediction uses space correlation of pixels in images of a video.

Inter-frame prediction and intraframe prediction are generally performed on pixel blocks.

For intraframe prediction, it generally uses pixels already reconstructed to extrapolate blocks to be predicted. For example, as for any one of blocks to be encoded in a current image, it uses surrounding pixels that have been reconstructed to perform interpolation in a certain direction, and takes the result after interpolation as a prediction block of the block to be encoded. Difference between the block to be encoded and the prediction block serves as a prediction residual, and the prediction residual is encoded after transform and quantization.

SUMMARY

According to one aspect of the present invention, there is provided an encoding method for performing intraframe encoding on an image, which may comprise: a step of pixel segmentation, segmenting pixels in an image frame into blocks; a step of pixel value prediction, respectively performing a pixel value prediction process to obtain a first prediction value for each of pixels in a current block to be encoded; a step of residual calculation, respectively performing a pixel value prediction process to obtain a first prediction value for each of pixels in a current block to be encoded; a step of discrete cosine transform, quantization and entropy encoding, performing discrete cosine transform, quantization and entropy encoding with respect to a residual block corresponding to the current block to be encoded obtained in the residual calculation step, wherein the quantized residual block is used in a pixel value reconstruction step at an encoding end, and the entropy encoded residual block is sent to a decoding end; and a pixel value reconstruction step, reconstructing a pixel value of the previously encoded pixel, the reconstructed pixel value being used in the step of pixel value prediction; the step of residual calculation including: calculating a first residual with respect to a pixel on the basis of the first prediction value of the pixel predicted in the pixel value prediction step and an actual value of the pixel; determining whether the first residual of the pixel is a normal residual or an abnormal residual; correcting the abnormal residual if the first residual of the pixel is an abnormal residual, the correction including recording a position of the pixel of which the abnormal residual has occurred; re-predicting the pixel to obtain a second prediction value and a corresponding second residual, and recording the re-prediction information, such that the pixel value reconstruction step of the encoding end and the decoding end can both reconstruct and decode the pixel value of the pixel on the basis of the position of the pixel of which the abnormal residual has occurred and the re-prediction information; wherein the normal residual block of the current block is formed by the residual of the pixel of the current block to be encoded after undergoing the abnormal residual correction, and is provided for further processing in the discrete cosine transform, quantization and entropy encoding step; separately encoding the position of the pixel of which the abnormal residual has occurred and the re-prediction information, wherein the encoding process is lossless, and the encoded pixel position and the re-prediction information are used in the pixel value reconstruction step and sent to the decoding end.

According to another aspect of the present invention, there is provided a decoding method for decoding an image frame, which may comprise: receiving encoded representation of an image block; obtaining residuals of respective pixels in the image block, by decoding, inverse quantizing and inverse discrete cosine transform, with respect to the encoded representation; receiving a position of a pixel where an abnormal residual has occurred and re-prediction information subjected to lossless encoding, and decoding the same; performing a pixel prediction process on each pixel in the image block, to obtain a first prediction value of the pixel; determining decoded pixel values of the respective pixels, based on the residuals of the respective pixels, the position of the pixel of which the abnormal residual has occurred and the re-prediction information, and the first prediction value of the pixel.

According to other aspects of the present invention, there is provided an encoder and a decoder corresponding thereto.

The encoding method, the decoding method, the encoder and the decoder corresponding thereto according to the embodiments of the present invention, by segmenting the pixel residual into the normal residual and the abnormal residual, and re-predicting the pixel of which the abnormal residual has occurred, make the abnormal residual to become the normal residual or that approximate to the normal residual, and are capable of improving accuracy of encoding and decoding.

According to another aspect of the present invention, there is provided an intraframe pixel prediction method for predicting a pixel within an image, comprising: a pixel rearranging step of rearranging pixels within an image frame; and a step of pixel value prediction of predicting pixel values of respective pixels rearranged by taking a pixel as a unit.

With the intraframe pixel prediction method according to the embodiment of the present invention, error diffusion may be avoided.

BRIEF DESCRIPTION OF THE DRAWINGS

From the following detailed description of the embodiments of the present invention in combination with the accompanying drawings, these and/or other aspects and advantages of the present invention will become clearer and more understandable, wherein:

FIGS. 7(a) and (b) respectively show image examples before and after pixel rearranging;

FIGS. 8(a) and (b) show image examples before and after pixel rearranging;

FIG. 11 shows a schematic diagram of grouping of a 21-point template according to an embodiment of the present invention, FIG. 12 shows a flow chart of an intraframe pixel prediction method 600 according to another embodiment of the present invention;

FIG. 13 shows a schematic diagram of positions of 7 adjacent pixels used in a gradient adaptive prediction method according to the present invention;

DETAILED DESCRIPTION

In order that those skilled in the art can better understand the present invention, a further detailed illustration of the present invention will be given below in combination with the accompany drawings and specific implementations.

Figure 1:
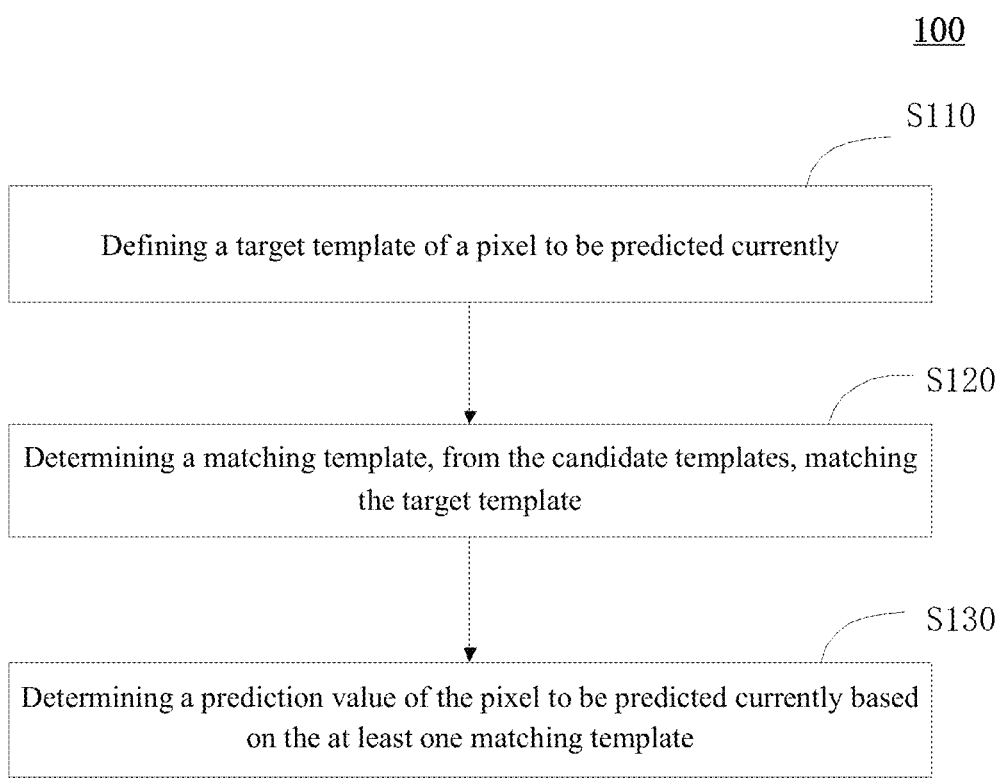
FIG. 1 shows a flow chart of an exemplary intraframe pixel prediction method 100 according to an embodiment of the present invention.

The description will be made below in the following sequence:

I. an example of an intraframe pixel prediction method
II. a first embodiment of an image encoder
III. a second embodiment of an image encoder
IV. an example of a pixel rearranging method
V. an embodiment of an image encoding method
VI. an embodiment of an image decoding method
VII. an embodiment of a 21-point template, and template matching prediction that introduces a matching index table
VIII. another embodiment of an intraframe pixel prediction method
IX. an embodiment of an extended image encoding method
X. an embodiment of an extended image decoding method
XI. an embodiment of an extended image encoder
XII. an embodiment of an extended image decoder I. An Example of an Intraframe Pixel Prediction Method FIG. 1 shows a flow chart of an exemplary intraframe pixel prediction method 100 according to an embodiment of the present invention;

In step S110, a target template of a current pixel to be predicted is defined.

In an example, the target template of the pixel may be formed of reconstructed pixels in a predetermined range around the pixel. Templates of different modes may be constructed according to requirements and/or features of graphics.

Figure 2:
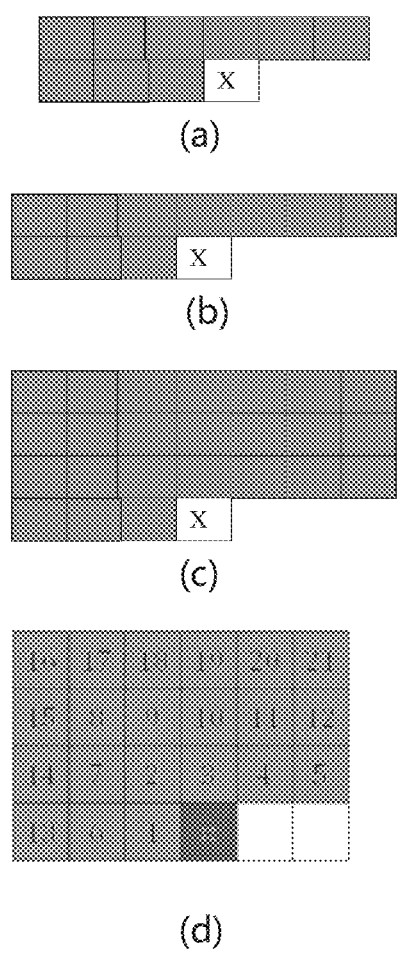
FIGS. 2(a), (b), (c) and (d) show schematic diagrams of lying L-shaped template examples, wherein the block indicated with "$X_a$" denotes a pixel to be predicted, and the respective dark colored blocks on the left side and upper side thereof denote pixels that are used for forming the template thereof.

For example, assuming that a scanning direction of pixel encoding is from left to right and from top to bottom, which means that when a pixel is encoded, pixels on the left side and upper side thereof may have been reconstructed, so a lying L-shaped template may be constructed. (a), (b), (c) and (d) in FIG. 2 show schematic diagrams of lying L-shaped template examples, wherein the block indicated with "X" denotes a pixel to be predicted, and the respective dark colored blocks on the left side and upper side thereof denote pixels that are used for forming the template thereof; in a 21-point template shown in FIG. 2(d), the 21 points are located in the left side and upper side of a current pixel, both in a reconstructed image region. An ordinal arrangement rule of the 21 points is arranging in an ascending manner sequentially from a leftmost pixel in an annular order; if a current serial number has exceeded the template range, then it restarts from a pixel that is not arranged from the left side.

In an example, a shape and a size of a pixel-associated template may be determined according to features of an image. For example, if most of content of the image are characters, the size of the template may be an average size of the characters.

If the scanning direction of pixel encoding in an image is from right to left and from bottom to top, a template of a pixel may be formed by pixels on the right side and lower side thereof.

In addition, a template of a pixel is not limited to the lying L-shaped form, and a pattern of the template may be designed according to requirements and image features.

It should be noted that, if there are pixels that have not be reconstructed in a template associated with a pixel, the pixels that have not be reconstructed may be marked as invalid points. As for the invalid points, the pixel values thereof may be deemed as 0 later.

It should be noted that the template of a pixel afore is described in a general form. For pixels located at an edge of an image, e.g. a pixel located in a top line or a leftmost line of an image, there is no lying L-shaped template. For such a pixel, the prediction value thereof may be directly set as a fixed value, e.g. 128, skipping the target template defining step S110 and the following matching template determining step S120 and prediction value determining step S130.

In step S120, the target template is compared with candidate templates in a search region of the frame, and at least one matching template, from the candidate templates, matching the target template is determined.

In an example, the search region may be whole of the region encoded or reconstructed previously. In another example, the search region may be a portion of the region encoded or reconstructed previously, e.g. a portion adjacent to the pixel to be predicted in the reconstructed region.

In an example, summation of absolute differences (SAD) of respective corresponding pixels between the target template and the candidate templates may be calculated as a measure of difference between the two, and the candidate template that has a smallest difference from the target template is taken as a matching template. In certain examples, mean square error (MSE) may be taken as the measure of difference. In another example, the measure of difference may further be normalized, e.g. by dividing the summation of absolute differences by number of pixels in the template. Furthermore, in the process of calculating differences between the target template and the candidate templates, as for invalid pixels, e.g. the above mentioned unreconstructed pixels, processing thereof may be skipped, which means that contribution of the invalid pixels is not taken into consideration in the process of calculating differences.

In an example, more than one matching templates may be selected. For instance, 3 candidate templates that have the least difference from the target template may serve as matching templates.

In step S130, a prediction value of the current pixel to be predicted is determined based on the at least one matching template.

For instance, in an example, according to relative position relationship between the current pixel to be predicted and the target template thereof, a reference pixel that has the relative position relationship with the matching template is obtained. For instance, in case where there is only one matching template, value of the reference pixel may be taken as a prediction value of the current pixel to be predicted. For another instance, in case of selecting a plurality of matching templates, respective corresponding reference pixels may be obtained and for example an average value of the plurality of reference pixels is obtained to serve as the prediction value of the current pixel to be predicted. Moreover, different weights may be given to the respective reference pixels; for instance, an associated reference pixel of the matching template that has a highest matching degree with the target template is given with the highest weight so that it has the greatest contribution in process of calculating the prediction value of the pixel to be predicted.

In the examples above, the prediction value of the pixel to be predicted is determined merely based on the reference pixels. In certain other examples, the prediction value of the pixel to be predicted may be calculated based on both of the matching templates and the reference pixels. For instance, an average value of all the pixels form the matching template and the reference pixels may be calculated to serve as the prediction value of the pixel to be predicted. Similarly, in the process of calculating the average value, different pixels may be given with different weights. For instance, weights may be given based on distances from the reference pixels. The smaller the distance from the reference pixels is, the higher the weight is; in contrast, the greater the distance from the reference pixels is, the lower the weight is.

In the intraframe pixel prediction method according to the embodiment of the present invention, template matching is conducted by taking a pixel as a unit, which is very different from traditional intraframe pixel prediction techniques in which template matching is conducted by taking a pixel block as a unit. In the traditional intraframe pixel prediction techniques, the greater the distance of a pixel in the pixel block from the template, the lower the accuracy of the prediction is. To the contrast, in the intraframe pixel prediction method according to the embodiment of the present invention, template matching is conducted by taking a pixel as a unit, and all the pixels can be predicted well.

The intraframe pixel prediction method according to the embodiment of the present invention is especially suitable for a Screen Content image. The Screen Content image means a screen picture displayed in the display of a desktop computer, a tablet computer or a mobile telephone or the like. The Screen Content image has some characteristics relative to images taken by normal cameras: firstly, the Screen Content image includes a plurality of similar points in a picture, for the Screen Content is exported from a processing device by application programs, is generally used for describing texts or graphic elements and has fewer colors; secondly, the Screen Content image has no noise; thirdly, the Screen Content image generally includes a plurality of sharp edges, especially in case where there are a large number of texts in the Screen Content; fourthly, the Screen Content image generally has a great size; and fifthly, content in many regions (e.g. non-textual regions) are very smooth.

Traditional intraframe pixel prediction methods based on pixel blocks are generally directed to images taken by cameras, and are not suitable for the Screen Content image. Furthermore, the greater the distance of pixels in the pixel block from a template is, the lower the accuracy of the prediction is. To the contrast, in the above-described intraframe pixel prediction method according to the embodiment of the present invention, template matching is conducted by taking a pixel as a unit, and the pixels can be predicted better.

Figure 3:
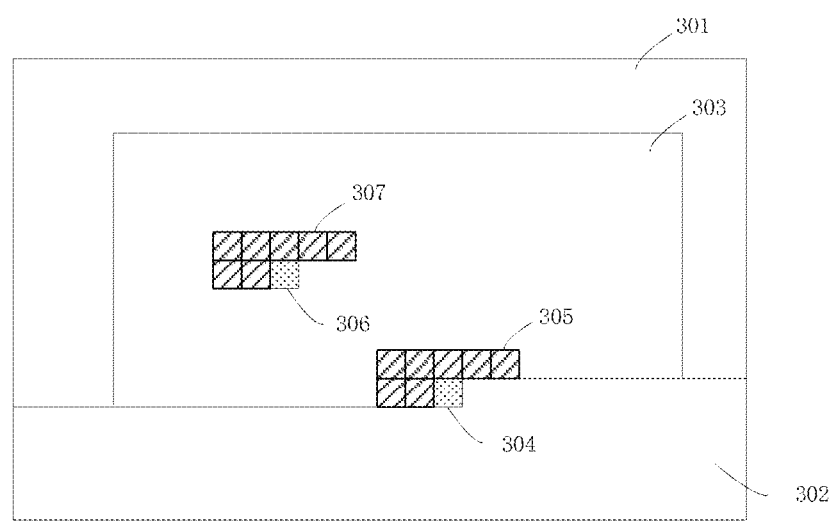
FIG. 3 shows an exemplary illustrative schematic diagram of intraframe prediction in an image 300 according to an embodiment of the present invention.

FIG. 3 shows an exemplary illustrative schematic diagram of intraframe prediction in an image 300 according to an embodiment of the present invention. The image 300 may be a concrete image that is being encoded by an encoder (e.g. an encoder 400 shown by following FIG. 4). The image 300 includes a portion 300 that has been encoded and reconstructed previously and a portion 302 to be encoded. The pixel 304 (shown in a dotted shadow) is a current pixel that is being predicted. The search region 303 is a portion of a reconstructed region 301; it is around the pixel 301 to be predicted but does not include the pixel that has not been encoded in the bottom right. The template 305 of the pixel 304 to be predicted (called as target template) is in the upper left of the pixel 304. In such an example, the template 305 includes 7 pixels that have been reconstructed, i.e., 2 pixels on the left side and 5 pixels on the upper side. The intraframe prediction for the pixel 304 is conducted by searching for matching template for the template 305 in the search region 303. The candidate template 307 in the search region 303 in the drawing has a pattern the same with that of the target template, and the candidate template 307 has a corresponding reference pixel 306. If the candidate template 307 is found in the search region 303 as matching template of the target template, in an example, the reference pixel 306 may be taken as a prediction value of the pixel 304 to be predicted, while in another example, a certain interpolation operation may be performed for the candidate template 307 and the reference pixel 306 and the interpolation result will be taken as a prediction value of the pixel 304 to be predicted.

II. A First Embodiment of an Image Encoder

Figure 4:
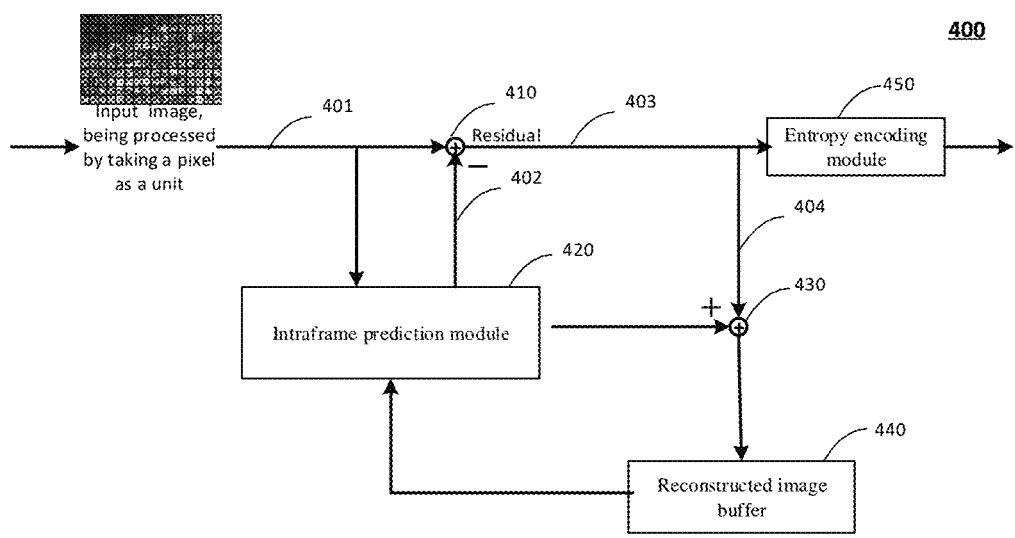
FIG. 4 shows a configuration block diagram of an image encoder 400 according to an embodiment of the present invention.

FIG. 4 shows a configuration block diagram of an image encoder 400 according to an embodiment of the present invention.

As shown in FIG. 4, the image encoder 400 comprises an intraframe prediction module 420, a reconstructed image buffer 440, an entropy encoding module 450, a subtracter 410 and an adder 430. Those skilled in the art would appreciate that the structure shown in FIG. 4 is not exclusive; to the contrary, the encoder may further comprise other components additionally such as a frame buffer.

Each image inputted is processed by taking a pixel as a unit. Image data is coupled to the intraframe prediction module 420.

The intraframe prediction module uses an intraframe pixel prediction method, e.g. described in combination with FIG. 1 to generate prediction of pixel to be encoded. Prediction in a path 402 from the intraframe prediction module 420 is subtracted from the current pixel to be encoded from a path 401 by the subtracter 410 so as to form a residual signal in a path 403. The residual signal in the path 403 is transferred to the entropy encoding module 450 for encoding, e.g. performing LZMA encoding. It should be noted that the residual signal may be alternatively transformed and quantized in the path 403 (not shown in FIG. 4).

The residual signal in the path 403 is further transferred to the adder 430 through a path 404 so as to reconstruct the pixel. Corresponding to the processing on 403, contrary processing may be performed in the path 404. For instance, if transform and quantization are performed on the 403, inverse transform and inverse quantization shall be performed on the path 404. Encoding in case where there is no transform and quantization is called as lossless encoding.

The adder 430 adds a prediction value from the intraframe prediction module 420 to the residual signal from the path 404 to obtain a reconstructed pixel that will be stored in the reconstructed image buffer 450.

The reconstructed image buffer 450 is coupled to the intraframe prediction module 420 so that the intraframe prediction module 420 uses previously reconstructed pixel regions to build prediction of the current pixel which is being encoded.

III. A Second Embodiment of an Image Encoder

All the traditional encoding methods conduct prediction by taking a block as a unit. One cause of such traditional block prediction is: traditional encoding technologies are of a block encoding mode, where both of transform and quantization for example are conducted by taking a block as a unit; if traditional encoding technologies directly take a pixel as a prediction unit (a template matching unit), there will be a problem of error diffusion. Assuming that the point in the upper left corner is (0, 0), points (1, 1), (2, 2) or a point that is far away from the left side and the upper side must use points that have been predicted such as point (0, 0) for template matching. However, there is a certain chance of prediction error for each point, and thus the error will gradually diffuse, so traditional methods cannot conduct a prediction by taking a point as a unit but taking a block as a unit.

In order to use the prediction method by taking a pixel as a unit according to the embodiments of the present invention in combination with traditional transform, quantization and encoding technologies of taking a block as a unit and overcome the problem of prediction error diffusion simultaneously, the embodiments of the present invention below design technologies of rearranging (or reorganizing) pixels for the original image, segmenting the rearranged image into blocks, and executing template matching and prediction by taking a pixel as a unit and executing transform, quantization and encoding by taking a block as a unit for pixels in the blocks in the original image.

Figure 5:
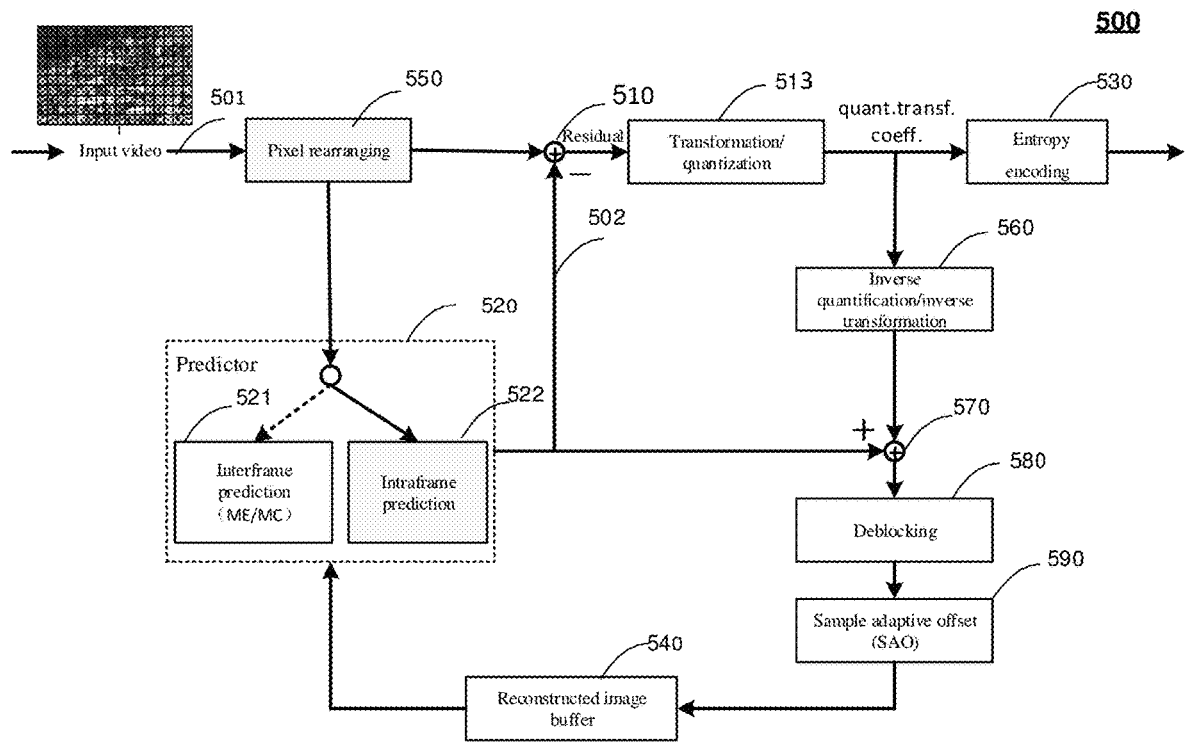
FIG. 5 shows an exemplary configuration block diagram of an image encoder 500 according to an embodiment of the present invention.

FIG. 5 shows an exemplary configuration block diagram of an image encoder 500 according to an embodiment of the present invention.

As shown in FIG. 5, the image encoder 500 may comprise a pixel rearranging module 550, a predictor 520, a subtracter 510, a transform module and/or a quantization module 513, an entropy encoder 530, an inverse transform/inverse quantization module 560, an adder 570, a deblocking module 580, a sample adaptive offset (SAO) module 590, a reconstructed image buffer 540 and a pixel rearranging module 550.

Input video data is coupled to the pixel rearranging module 550 through a path 501, and it is rearranged (reorganized) in the pixel rearranging module 550 and segmented into blocks. Video data after being segmented into blocks is coupled to the predictor 520. In an example, the pixel rearranging module 550 rearranges pixels and divides the pixels into blocks to obtain respective blocks as encoding targets, such that a plurality of pixels in segmented blocks do not appear in original blocks in frames before the rearranging simultaneously as much as possible, and such that when a pixel in a segmented block is being predicted, pixels in its target template in the frame before the rearranging have been reconstructed as much as possible. In an example, blocks of different sizes exist in the segmented blocks by the pixel rearranging module 550; preferably, the pixel rearranging module 550 makes sizes of the segmented blocks be the size of a block in a concrete encoding standard as much as possible. Below, functions and operations of the pixel rearranging module 550 will be described in detail in conjunction with examples. The predictor 520 may include an inter-frame prediction module 521 and an intraframe prediction module 522. The inter-frame prediction module 521 may perform a motion estimation (ME) operation and a motion compensation (MC) operation. For each pixel in a current block to be encoded that after rearrangement, the intraframe prediction module 522 conducts operations such as target template defining, template matching and prediction value determining by taking a pixel as a unit in conjunction with description on FIGS. 1, 2 and 3. The predictor 520 uses pictures decoded previously stored in the reconstructed image buffer 540 to build estimation of the current picture being encoded.

Generally, an encoding form may be selected prior to the prediction. There are various kinds of different encoding forms. Such encoding forms are grouped into two categories, i.e., inter-frame encoding and intraframe encoding. In the embodiments of the present invention, intraframe encoding relates to encoding blocks and macro-blocks in pictures after rearranging by using intraframe prediction, wherein intraframe prediction is being conducted through the use of template matching by taking a pixel as a unit in pictures before the rearranging. Such prediction on each pixel in the block forms prediction on the block. It should be noted that traditional intraframe prediction technologies generally conduct template defining and template matching by taking a block as a unit, as mentioned above.

After the predictor 520 obtains prediction of blocks after the rearranging, prediction in a path 502 is subtracted by the subtracter 510 from the blocks after the rearranging to form a residual signal, and the residual signal is transferred to the transform/quantization module 513 for encoding.

The transform/quantization module 513 subsequently uses transform and/or quantization operations. The transform operation is for instance a transform for example based on Discrete Cosine Conversion (DCT), and the quantization operation is to quantify coefficients after the transform.

The generated quantized coefficients after the transform are inverse quantization and inverse transform operated in the inverse quantization/inverse transform module 560 to obtain a decoded residual, then the decoded residual is added to the prediction from the predictor 520 in the adder 570, and thus reconstructed image data is obtained. In this embodiment, reconstructed blocks are further subjected to processing of minimizing of block effect in a deblocking filter 580. The reconstructed image after the deblocking processing is subjected to a sample adaptive offset in the sample adaptive offset module 590, and then is stored in the reconstructed image buffer 540 for the predictor 520 to conduct inter-frame prediction and/or intraframe prediction.

The quantized coefficients after the transform from the transform/quantization module 513 are further transferred to the entropy encoder 530. An entropy encoder 180 may perform encoding algorithms such as nonzero residual adaptive encoding, Context-based Adaptive Variable Length Coding (CAVLC) or Context-based Adaptive Binary Arithmetic Coding (CABAC). Encoded data stream, after being rate-controlled and buffered for example, is transmitted to the decoder side, IV. An Example of a Pixel Rearranging Method As stated above, the pixel rearranging module 550 may rearrange pixels and divide pixels into blocks to obtain respective blocks as encoding targets, such that a plurality of pixels in a segmented block do not appear in a same original block in the frame before the rearranging simultaneously as much as possible, and such that when a pixel in a segmented block is being predicted, the pixels in its target template in the frame before the rearranging have been reconstructed as much as possible. By that a plurality of pixels in a segmented block do not appear in a same original block in the frame before the rearranging simultaneously as much as possible, it may avoid from error diffusion in the pixel prediction process. By that when a pixel in a segmented block is being predicted, the pixels in its target template in the frame before the rearranging have been reconstructed as much as possible, it may improve accuracy rate of pixel prediction.

In an example, blocks of different sizes exist in the blocks obtained after the segmenting pixels into blocks operation by the pixel rearranging module 550; preferably, the pixel rearranging module makes sizes of the segmented blocks be the size of a block in a concrete encoding standard as much as possible.

Below, an exemplary pixel rearranging method performed by the pixel rearranging module 550 is described in detail.

In an example, different pixel rearranging algorithms are used according to whether a size of an image is an integral multiple of an encoded block.

1. As for a case where the size of an image is an integral multiple of an encoded block Suppose that the size of an image is M×N, and a size of an encoded block is T×T, M and N being integral multiples of T, wherein M denotes number of rows in the image and N denotes number of columns in the image, pixel row at the top of the image being called as row 0 and pixel column on the leftmost side of the image being called as column 0, wherein $P_{i,j}$ denotes a pixel which is located in row i and column j in the image, where $0 \leq i \leq M-1$, and M, N and T are positive integers greater than 1, and Suppose that pixel $R_{p,q}$ in row p and column q after the reorganizing corresponds to the pixel $P_{i,j}$ before the reorganizing, where $0 \leq p \leq M-1$, $0 \leq q \leq N-1$.

In an example, formulas for calculating i,j are respectively Formulas (1) and (2):

$$i=(p \bmod T)\times(M/T)+\text{rounddown}(p/T) \quad (1)$$

$$j=(q \bmod T)\times(N/T)+\text{rounddown}(q/T) \quad (2)$$

where mod denotes a modulo operation, × denotes a multiply operation, and rounddown( ) denotes a round down operation.

Figure 6:
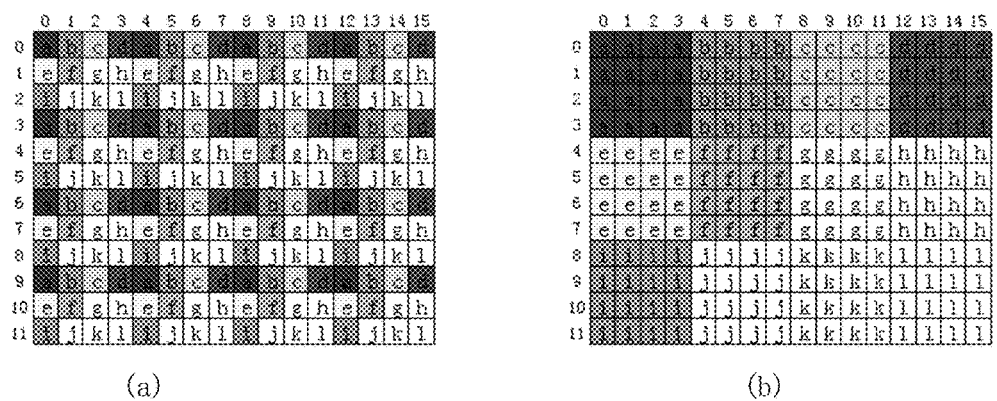
FIGS. 6(a) and (b) show image examples before and after pixel rearranging.

For instance, taking an image where M=12, N=16 and T=4 as an example, (a) and (b) in FIG. 6 show image examples before and after the pixel rearranging, wherein (a) in FIG. 6 is an original image and each small block denotes a pixel, and wherein different pixels are marked with different gray scales and mark numbers indicated with lowercase letters; and (b) in FIG. 6 is a new image after the image is reorganized, wherein pixels with the same gray scale and mark number will constitute 12 4×4 image blocks after being reorganized.

2. As for a case where the size of an image is not an integral multiple of an encoded block Suppose that the size of an image is M×N, and the size of an encoded block is T×T, values of M and N being not integral multiples of T, wherein M denotes number of rows in the image and N denotes number of columns in the image, pixel row at the top of the image being called as row 0 and pixel column on the leftmost side of the image being called as column 0, wherein $P_{i,j}$ denotes a pixel which is located in row i and column j in the image, where $0 \leq i \leq M-1$, and M, N and T are positive integers greater than 1;

Suppose that pixel $R_{p,q}$ in row p and column q after the reorganizing corresponds to the pixel $P_{i,j}$ before the reorganizing, size of the image after the reorganizing is $((\text{rounddown}(M \diagup T)+1)\times T)\times((\text{rounddown}(N \diagup T)+1)\times T)$, where $(\text{rounddown}(M \diagup T)+1)\times T$ denotes number of rows in the image after the reorganizing, $(\text{rounddown}(N \diagup T)+1)\times T$ denotes number of columns in the image after the reorganizing, $0 \leq p \leq (\text{rounddown}(M \diagup T)+1)\times T-1$ and $0 \leq q \leq (\text{rounddown}(N \diagup T)+1)\times T-1$, pixel $R_{p,q}$ in the image after the reorganizing corresponds to the pixel $P_{i,j}$ in the image before the reorganizing, wherein formulas for calculating i,j are (3)-(8) as follow:

$i=(p \bmod T) \times (\mathrm{rounddown}(M/T)+1)+\mathrm{rounddown}(p/T)$
when $(p \bmod T) > (M \bmod T)$, (3)

$i=(M \bmod T) \times (\mathrm{rounddown}(M/T)+1)+((p \bmod T)-(M \bmod T)) \times \mathrm{rounddown}(M/T)+\mathrm{rounddown}(p/T)$
when $(p \bmod T) >= (M \bmod T)$ and $p<M$, (4)

$i$ does not have a valid value, where $R_{p,q}=0$, when $p>=M$, (5)

where formulas for calculating j are:

$j=(q \bmod T) \times (\mathrm{rounddown}(N/T)+1)+\mathrm{rounddown}(q/T)$
when $(q \bmod T) < (N \bmod T)$, (6)

$j(N \bmod T) \times (\mathrm{rounddown}(N/T)+1)+((q \bmod T)-(N \bmod T)) \times \mathrm{rounddown}(N/T)\mathrm{rounddown}(q/T)$
when $(q \bmod T) >= (N \bmod T)$ and $q<N$, (7)

$j$ does not have a valid value, where $R_{p/q}=0$, when $q>=N$. (8)

Figures 7, 8:
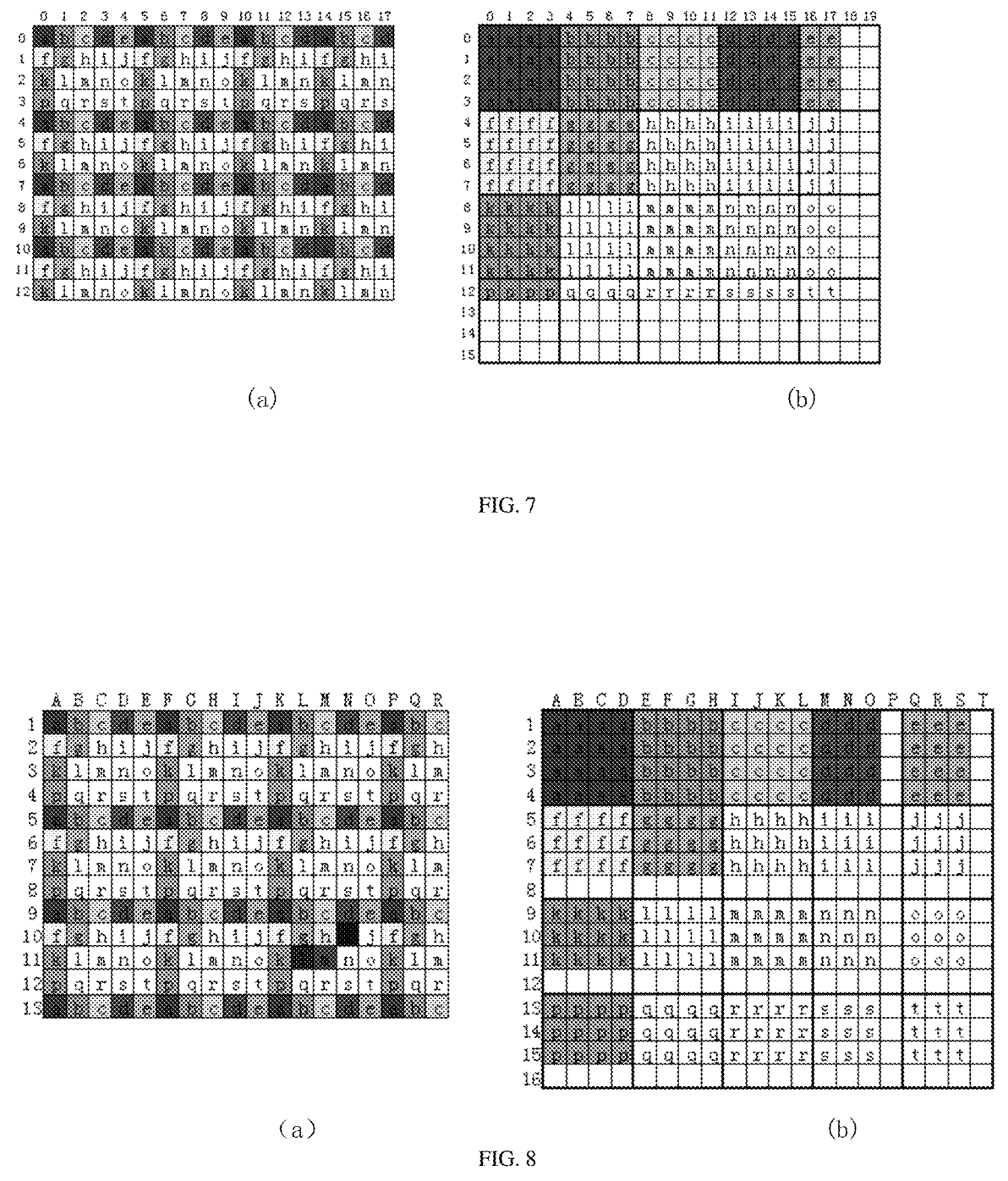

For instance, taking an image where M=18, N=13 and T=4 as an example, (a) and (b) in FIG. 7 respectively show image examples before and after the pixel rearranging, wherein (a) in FIG. 7 is an original image and each small block denotes a pixel, wherein different pixels are marked with different gray scales and mark numbers indicated with lower-case letters; and (b) in FIG. 7 is a new image after the image is reorganized, wherein pixels with the same gray scale and mark number will constitute 20 4×4 image blocks after being reorganized, and wherein blank pixels indicate invalid pixels. In an example, encoding algorithms generally take these residuals located at invalid pixel positions as 0 for encoding.

Below, another exemplary pixel rearranging method in a case where the size of an image is not an integral multiple of an encoded block will be illustrated. Suppose that size of an image is M×N, and the size of an encoded block is T×T, values of M and N being not integral multiples of T, where, M denotes number of rows in the image and N denotes number of columns in the image, pixel row at the top of the image being called as row 0 and pixel column on the leftmost side of the image being called as column 0, wherein $P_{i,j}$ denotes a pixel which is located in row i and column j in the image, where $0 \le i \le M-1$, $0 \le i \le N-1$, and M, N and T are positive integers greater than 1;

Suppose that pixel $R_{p,q}$ in row p and column q after the reorganizing corresponds to the pixel $P_{i,j}$ before the reorganizing, the size of the image after the reorganizing is $((\mathrm{rounddown}(M \diagup T)+1) \times T) \times ((\mathrm{rounddown}(N \diagup T)+1) \times T)$, where $(\mathrm{rounddown}(M \diagup T)+1) \times T$ denotes number of rows in the image after the reorganizing, $(\mathrm{rounddown}(N \diagup T)+1) \times T$ denotes number of columns in the image after the reorganizing, $0 \le p \le (\mathrm{rounddown}(M \diagup T)+1) \times T$ and $0 \le q \le (\mathrm{rounddown}(N \diagup T)+1) \times T$, pixel $R_{p,q}$ in the image after the reorganizing corresponds to the pixel $P_{i,j}$ in the image before the reorganizing, where, formulas for calculating i,j are (9)-(14) as follow:

$i=(p \bmod T) \times (\mathrm{rounddown}(M/T)+1)+\mathrm{rounddown}(p/T)$
when $(p \bmod T) < (M \bmod T)$, (9)

$i=(M \bmod T) \times (\mathrm{rounddown}(M/T)+1)+((p \bmod T)-(M \bmod T)) \times \mathrm{rounddown}(M/T)+\mathrm{rounddown}(p/T)$
when $(p \bmod T) >= (M \bmod T)$ and $p<M$, (10)

$i$ does not have a valid value, where $Rp,q=0$, when $p>=M$, (11)

where formulas for calculating j are:

$j=(q \bmod T) \times (\mathrm{rounddown}(N/T)+1)+\mathrm{rounddown}(q/T)$
when $(q \bmod T) < (N \bmod T)$, (12)

$j=(N \bmod T) \times (\mathrm{rounddown}(N/T)+1)+((q \bmod T)-(N \bmod T)) \times \mathrm{rounddown}(N/T)\mathrm{rounddown}(q/T)$
when $(q \bmod T) >= (N \bmod T)$ and $q<N$, (13)

$j$ does not have a valid value, where $R_{p,q}=0$, when $q>=N$, (14)

where mod denotes a modulo operation, x denotes a multiply operation, and rounddown( ) denotes a round down operation.

For instance, taking an image where M=18, N=13 and T=4 as an example, (a) and (b) in FIG. 8 show images before and after the pixel rearranging, where (a) in FIG. 8 is an original image and each small block denotes a pixel, where different pixels are marked with different gray scales and mark numbers indicated with lower-case letters; and (b) in FIG. 8 is a new image after the image is reorganized, where pixels with the same gray scale and mark number will constitute 20 4×4 image blocks after being reorganized, and where blank pixels indicate invalid pixels. In an example, encoding algorithms take these residuals located at invalid pixel positions as 0 for encoding.

As for the case where the size of an image is not an integral multiple of T, the pixel rearranging methods as shown by (a) and (b) of FIG. 7 and (a) and (b) of FIG. 8 are only examples, there may further be other pixel reorganizing solutions that meet the following characteristics, whose general principle is that a plurality of pixels in a block obtained after segmenting the pixels into blocks do not appear in an original block in the frame before the rearranging simultaneously as much as possible, and that when a pixel in the segmented block being predicted, pixels in its target template in the frame before the rearranging have been reconstructed as much as possible; furthermore, the size of the image after the reorganizing is $((\mathrm{rounddown}(M \diagup T)+1) \times T) \times ((\mathrm{rounddown}(N \diagup T)+1) \times T)$.

V. An Embodiment of an Image Encoding Method

Figure 9:
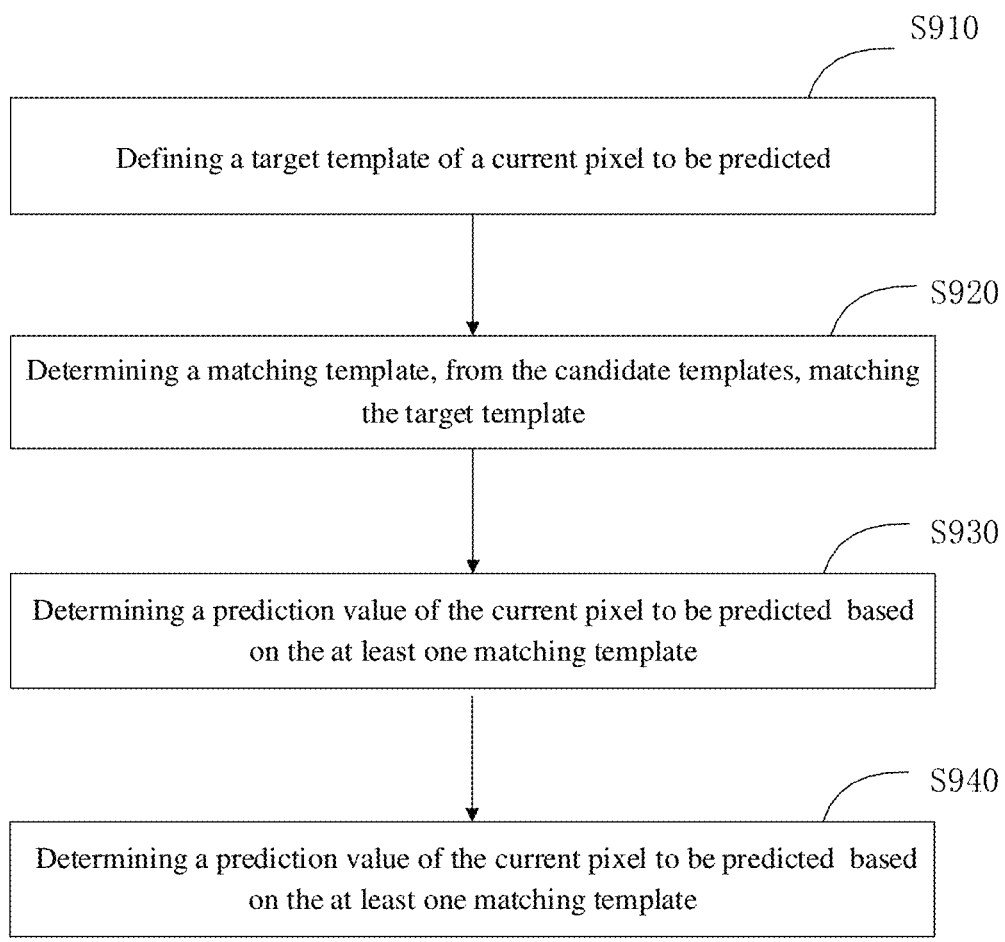
FIG. 9 shows a flow chart of an exemplary image encoding method according to an embodiment of the present invention.

FIG. 9 shows a flow chart of an exemplary image encoding method according to an embodiment of the present invention.

As shown by FIG. 9, in step S910, a target template of a current pixel to be predicted is defined, and then it proceeds to step S920.

In step S920, the target template is compared with candidate templates in a search region of the frame, and at least one matching template, from the candidate templates, matching the target template is determined, and then it proceeds to step S930.

In step S930, a prediction value of the current pixel to be predicted is determined based on the at least one matching template, and then it proceeds to step S940.

In step S940, the current pixel to be predicted or the block to which the current pixel to be predicted belongs is encoded based on the prediction value of the current pixel to be predicted.

For concrete operations of the steps S910, S920 and S930, the steps S110, S120 and S130 described in conjunction with FIG. 1 may be referred to.

For encoding operation of the step S940, the functions and operations of the encoder described in conjunction with FIG. 4 and the encoder described in conjunction with FIG. 5 may be referred to.

In an example, the encoding method may further comprise: a pixel reorganizing and block-segmenting step of rearranging pixels and segmenting the pixels into blocks, obtaining respective blocks as encoding targets so that a plurality of pixels in a segmented block do not appear in a same original block in the frame before the rearranging simultaneously as much as possible, and so that when a pixel in a segmented block is being predicted, pixels in its target template in the frame before the rearranging have been reconstructed as much as possible; and with respect to a current block to be encoded, executing the above-described target template defining step, a matching template determining step and a prediction value determining step in the frame before the rearranging, thereby obtaining a prediction value of each pixel so as to obtain a prediction block of the current block to be encoded; and encoding the current block to be encoded by using the prediction block of the current block to be encoded.

VI. An Embodiment of an Image Decoding Method

Figure 10:
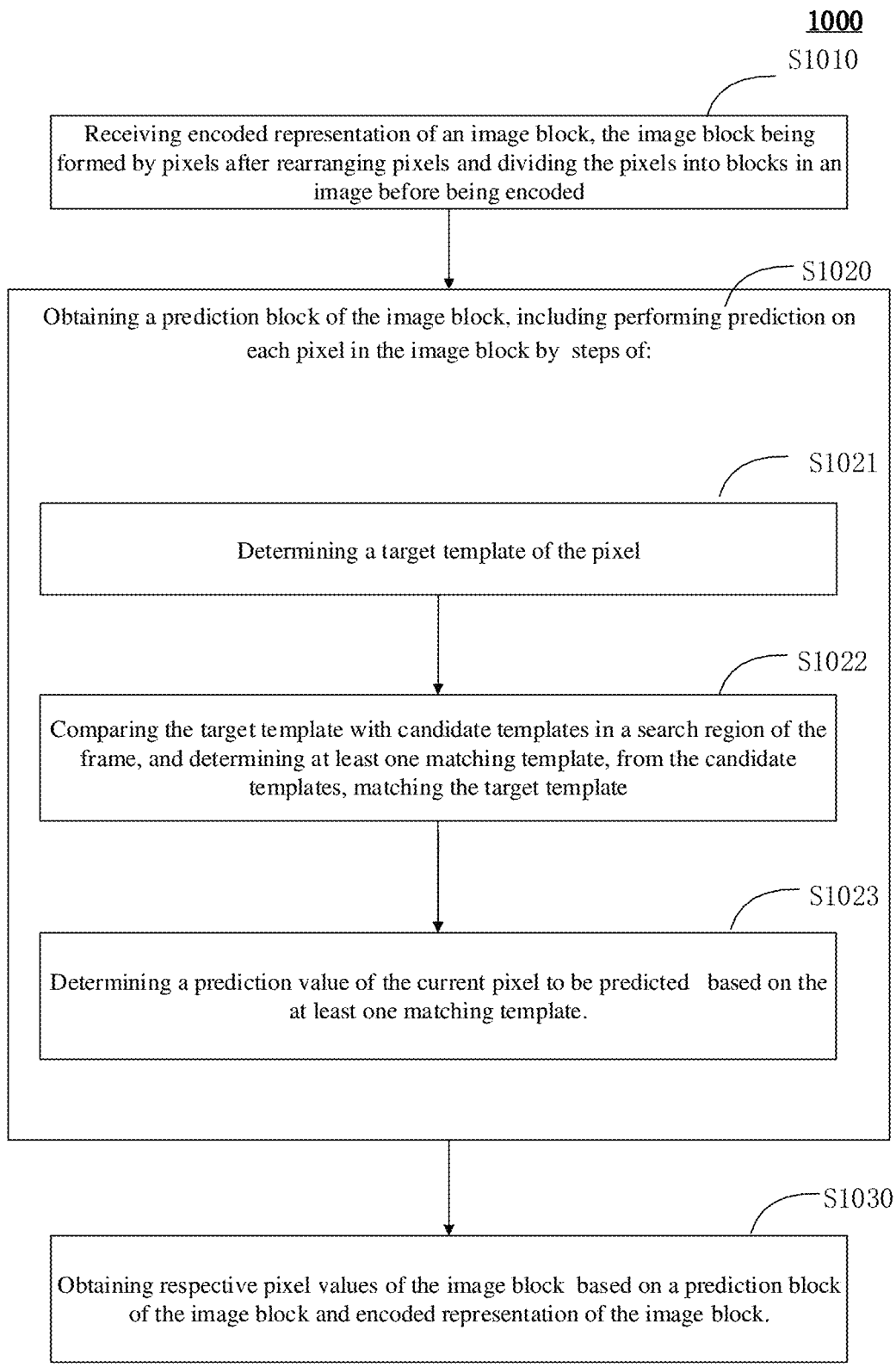
FIG. 10 shows a flow chart of an exemplary decoding method 1000 for image frame decoding according to an embodiment of the present invention.

FIG. 10 shows a flow chart of an exemplary decoding method 1000 for image frame decoding according to an embodiment of the present invention.

The decoding method may be deemed as an inverse operation to the encoding method.

As shown in FIG. 10, in step S1010, encoded representation of an image block is received, the image block being formed by pixels after rearranging pixels and segmenting the pixels into blocks in an image before being encoded, and then it proceeds to step S1020.

In step S1020, a prediction block of the image block is obtained, and then it proceeds to step S1030. Step S1020 includes predicting each pixel in the image block by the following steps: in step S1021, a target template of the pixel is determined, and then it proceeds to step S1022. In step S1022, the target template is compared with candidate templates in a search region of the frame, and at least one matching template, from the candidate templates, matching the target template is determined. In step S1023, a prediction value of the current pixel to be predicted is determined based on the at least one matching template.

In step S1030, respective pixel values of the image block are obtained based on a prediction block of the image block and encoded representation of the image block. As stated above, the encoded representation is a residual of the blocks after the rearranging. A decoded pixel value is obtained by adding the prediction block and the residual of the block.

Determining a target template of the pixel in step S1022 may include: determining an initial position of the pixel in an original image; and determining the target template of the pixel based on reconstructed pixels around the initial position.

The search region may be a region on the upper left side of the current pixel to be predicted of the frame.

VII. An Embodiment of a 21-Point Template, and Template Matching Prediction that Introduces a Matching Index Table In one embodiment, in an intraframe pixel prediction (or pixel encoding) method process based on template matching, in order to improve efficiency of searching a matching template matching a target template of a pixel to be predicted, there is proposed a method for organizing a template and updating and searching the template based on the matching index table.

In one embodiment, the intraframe pixel prediction (or encoding) method based on template matching further comprises a matching index table constructing step of extracting a template feature with respect to a target template of a pixel value of which has been predicted, and constructing a Hash Table, Thus, the above-described matching template determining step may include extracting the feature of the target template, and locating the template matching the target template in the Hash Table based on the extracted feature. In one example, if no template matching the target template is located in the Hash Table, a new node is constructed based on the target template and added into the Hash Table. The extracting the template feature may include segmenting the template into subgroups, obtaining pixel representation values of respective subgroups, and taking the pixel representation values of the respective subgroups as the feature of the template. In one example, with respect to a target template of one pixel, the number of pixels within a subgroup closer to the pixel is smaller than the number of pixels within a subgroup farther away from the pixel. In one example, the pixel representation values of the respective subgroups are average values of pixels of the subgroups.

Below, a process of constructing, retrieving, and updating the Hash Table is illustrated with the 21-point template shown in FIG. 2(d) as an example.

The Hash Table is a data structure for quick search based on a keyword. The Hash Table is characterized by very fast search, and a disadvantage is that construction of a Hash function must be reasonable and additional storage space is needed. Although a template matching prediction method has good predictive accuracy, it also leads to exponential growth of a time taken for prediction. In addition, the template matching prediction method is essentially a process of searching an optimal similar template, and it is possible to accelerate a template searching process by introducing a hash method.

The Hash Table sacrifices the storage space in exchange for a constant-level search speed. The Hash Table is capable of directly finding an object to be searched without exhaustive comparison, and a key therein is to map the object to be searched to a storage position in a memory through a Hash function. The Hash function is a core problem of design of the Hash Table, and construction of the Hash function usually requires short calculation time, guarantee of storage position distribution to be as uniform as possible, and reduction of probability of conflict caused by different search objects mapped to a same position. Most of Hash functions are unable to guarantee that no conflict occurs, and with respect to a conflict processing strategy, conflict search objects are generally recorded with a chain table.

In one example, in order to construct a Hash function corresponding to the 21-point template shown in FIG. 2D, firstly, according to a position of a currently encoded pixel, the 21-point template shown in FIG. 2(d) may be segmented into 8 groups below, as shown in FIG. 11.

500 G1:{1}
500 G2:{2}
500 G3:{3}
500 G4:{4, 5}
500 G5:{6, 7, 13, 14}
500 G6:{8, 15, 16, 17}
500 G7:{9, 10, 18, 19}
500 G8:{11,12, 20, 21}

Where, G1, G2 and G3 groups include one pixel of pixels 1, 2 and 3 respectively, G4 group includes two pixels 4 and 5, G5 group includes four pixels 6, 7, 13 and 14, G6 group includes four pixels 8, 15, 16 and 17, G7 group includes four pixels 9, 10, 18 and 19, G8 group includes four pixels 11, 12, 20 and 21. The eight groups are averaged, and first three bits of average values of each group of pixel values are obtained from the first group to the eighth group, to constitute a 24-bit Hash value. With respect to templates with a same Hash value, they are stored in a chain table. With respect to the value of the Hash value, position information of the template and distribution situation of pixel color values are taken into comprehensive consideration, a group which is closer to the pixel "x" to be predicted is more important in the Hash value, and by averaging the respective groups, it is possible to effectively suppress influence of a noise of a position away from the "x" on the Hash value, so as to ensure that the Hash value, as the template feature, can significantly identify different templates. At a same time, with respect to calculation of the Hash value, influence of loss encoding on calculation of the Hash value is also taken into consideration. When loss encoding is performed, the averaging method ensures stability of the Hash value.

After the Hash Table of the template is established, a template searching process is converted into a Hash Table searching process. It should be specifically noted that, in order to ensure consistency of a Hash Table state of the encoding and decoding process, it is necessary to complete the searching process with the Hash Table, when the encoding unit CU is predicted, and update the Hash Table for one time in a unified way, after the reconstructed image of the CU is obtained. A first step in the Hash Table searching process is calculating the Hash value of the template based on the current pixel to be encoded, and searching an optimal matching template for the current template in the chain table corresponding to the Hash value. In one example, in the Hash Table searching process, a standard for determining that two templates are the same is relaxed to that there are 18 points equal to each other among the 21 points; and if the condition is satisfied, it immediately returns so as to further accelerate the searching process on a basis of Hash Table acceleration. A Hash Table updating process is almost the same as the Hash Table searching process, except for some minor differences. The updating process is also firstly calculating the Hash value, and then traversing the chain table corresponding to the Hash value; if the templates in the chain table are all different, current template information is added to the chain table. And the updating process also uses a same standard of the above-described template, and if the templates are the same, they will not be placed in the chain table.

In order to further reduce time of template matching prediction, it is possible to limit a length of the chain table in the Hash Table to not exceed a limited length. In an actually encoding process, a reasonable limited value may be given according to requirements of encoding time and efficiency. For example, in one example of the embodiment of the present invention, the length of the chain table is limited to be no more than one-tenth of a length of the image. AT a same time, in one example, in order to save the storage space of the Hash Table, with respect to the 21-point tern plate, for the template which conforms to the standard of the same template, only one template may be recorded, VIII. Another Embodiment of an Intraframe Pixel Prediction Method Hereinbefore, the template matching method is used, when prediction is performed by taking a pixel as a unit, and that the pixel prediction is used in image encoding and image decoding. However, prediction by taking a pixel as a unit is not limited to use of the template matching methods, but other prediction method may also be used. By firstly rearranging pixels in the received image frame and then performing a pixel value prediction by taking a pixel as a unit, it may avoid error diffusion in the conventional image encoding process.

Another embodiment of the intraframe prediction method is described below with reference to FIG. 12. FIG. 12 shows a flow chart of an intraframe pixel prediction method 1200 according to another embodiment of the present invention;

As shown in FIG. 12, in step S1210, a pixel rearranging step is executed, to rearrange pixels in an image frame.

In addition, in a case where pixel block encoding is performed subsequently, the rearranged pixels may be segmented into blocks.

For the pixel rearrangement method, foregoing description in conjunction with FIG. 6 to FIG. 8 may be referred to.

After the pixel rearranging is performed in step S1210, it proceeds to step S1220.

In the step S1220, a step of pixel value prediction is executed, to perform prediction on pixel values of respective pixels rearranged by taking a pixel as a unit.

In one example, pixel value prediction may be performed by using the template matching prediction method based on template matching as described above in conjunction with FIG. 1 to FIG. 3 by taking a pixel as a unit.

In one example, the step of pixel value prediction, respectively performing a pixel value prediction process on each pixel in a block, by using a template matching method, to obtain a first prediction value, includes: a target template obtaining step of obtaining the target template of a current pixel to be predicted; a matching template determining step of comparing the target template with a candidate template of a search region of the frame, and determining at least one matching template in the candidate templates that matches the target template; and determining, based on the at least one matching template, the prediction value of the pixel.

In one example, the performing pixel value prediction, by using a template matching method may further include: a matching index table constructing step of extracting a template feature with respect to a target template of a pixel whose value has been predicted, and constructing a Hash Table; wherein, the matching template determining step includes extracting the feature of the target template, and locating the template matching the target template in the Hash Table based on the extracted feature, In one example, the extracting the template feature may include segmenting the template into subgroups, obtaining pixel representation values of respective subgroups, and taking the pixel representation values of the respective subgroups as the feature of the template.

In one example, with respect to a target template of one pixel, the number of pixels within a subgroup closer to the pixel is smaller than the number of pixels within a subgroup farther away from the pixel.

In one example, the pixel representation values of the respective subgroups are average values of pixels of the subgroups.

In one example, a target template of a pixel X includes 21 pixels, which are respectively, three pixels on the left side of the pixel X, and three rows of pixels immediately on the upper side of the pixel, each of the three rows of pixels having 6 pixels, which are respectively three pixels on the left side of the pixel X, one pixel on the upper side of the pixel and two pixels on the right side of the pixel X, wherein, each of the three pixels immediately adjacent to the pixel X is a subgroup, two pixels on the leftmost side of a same row of the pixel X and two immediately adjacent pixels respectively on the upper side of the two pixels constitute one subgroup, two pixels on the rightmost side of a row prior to the row where the pixel X is located constitute one subgroup, and four pixels of each two rows above the row where the pixel X is located, among two non-adjacent rows in an order from left to right constitute one subgroup, so as to constitute eight subgroups, and the pixel representation values of the eight subgroups are taken as the template feature.

In one example, if no template that matches the target template is located in the Hash Table, a new node is constructed based on the target template and added to the Hash Table.

In another example, it is not that a specific pixel prediction algorithm is used routinely, but that before actual execution of pixel prediction, firstly the pixel prediction algorithm is determined, and then prediction is performed by using the determined pixel prediction algorithm.

For example, if the pixels are located on the upper side and on the left side of the rearranged image, a JPEG-LS prediction algorithm is used; otherwise, prediction is performed by using a template matching algorithm. This is because, after experimental statistics, the inventor has found that, generally, with respect to the pixels located on the left side and on the upper side of the image, as compared with pixels located in the middle, on the right side and on the lower side of the image, a predictive effect of the template matching algorithm is poorer. Here the upper side and the left side refer to the upper side and the left side with respect to a midpoint of the image, and in one example, for example, refer to two rows on the upper side and two rows on the left side of the image; of course, it is not limited thereto, and the number of the rows on the upper side and the number of rows on the left side may be determined according to a size of the image and a specific situation of the template matching algorithm used.

For another example, the prediction algorithm used therefor may be determined based on prediction algorithm used for pixels in the image before rearrangement around the pixel to be predicted.

The prediction algorithm may be selected from a set of prediction algorithms below, and the set of prediction algorithms include a template matching algorithm, a weighted template matching algorithm, a JPEG-LS prediction method, and a gradient adaptive prediction method. The template matching algorithm is just the intraframe prediction method based on template matching according to the embodiment of the present invention as described above. Hereinafter, the other three algorithms are briefly introduced.

The weighted template matching method is a simplified version of a non-local means (NLM) with respect to intraframe encoding, and for introduction of the NLM method, introduction in a non-patent document BuadesA, Col I B, Morel J M, A non-local algorithm for image denoising. Computer Vision and Pattern Recognition, 2005. CVPR2005. IEEE Computer Society Conference on, volume 2. IEEE, 2005.60, 65 may be referred to. A weighting coefficient calculation method in the weighted template matching method is the same as a method for calculating a weight in the non-local mean, both calculating the weight by using result similarity between the template within the search region and the current template, to ensure that a template more similar to the current template has a larger weight, and a template less similar to the current template has a smaller weight; and for the weighted template matching method, introduction in a non-patent document Wige E, Yammine G, Amon P, et al. Pixel-based averaging predictor for hevc lossless encoding ICIP, 2013. 1806, 1810. may be referred to.

JPEG-LS is a lossless encoding method of JPEG2000. Although a JPEG standard has a lossless encoding method, yet for various reasons, it has not been widely used. The JPEG-LS standard requires that the number of bits used for encoding is reduced in a case where complexity of the algorithm is as low as possible. JPEG-LS is a low-complexity image compression algorithm, mainly using technologies such as context adaptive encoding, image prediction, adaptive Columbus encoding and variable length encoding, whose compression performance is better than that of the JPEG2000 lossless encoding method. In the JPEG-LS prediction method, prediction is performed by using texture features between three adjacent reconstructed pixels. In the JPEG-LS prediction method, by three near neighbor points on the left side, on the upper side and on the upper left side of the current pixel, prediction is performed on the current pixel, based on very simple edge detection. Assuming that the current pixel is "x", a pixel value of the pixel on the left side is Left, a pixel value of the pixel on the upper side is Above, and a pixel value of the pixel on the upper left side is AboveLeft. A specific prediction process is calculating a maximum value Max and a minimum value Min of Left, Above and AboveLeft; if Max is equal to AboveLeft, then a prediction value of "x" is equal to the minimum value of Left and Above; if Min is equal to AboveLeft, then the prediction value of "x" is equal to the maximum value of Left and Above; otherwise, the prediction value of "x" is Above+Left−AboveLeft. For detailed introduction of JPEG-LS, a non-patent document Weinberger M J, Seroussi G, Sapiro G. The loco-I lossless image compression algorithm: principles and standardization into jpeg-ls. Image Processing, IEEE Transactionson, 2000, 9(8): 1309, 1324. may be referred to.

In the gradient adaptive prediction method, the value of the current pixel is predicted by using a gradient of pixels around the current pixel. Unlike a linear prediction method, the gradient adaptive prediction method has very good robustness with respect to a strongly changing region in the image. In the gradient adaptive method, three gradients in a vertical direction and in a horizontal direction are calculated respectively, and then they are respectively added up to obtain gradient estimates in the vertical direction and in the horizontal direction. A prediction result is obtained by calculation and comparison between sizes of the gradient estimates in the vertical direction and in the horizontal direction.

Positions of 7 adjacent pixels used in the gradient adaptive prediction method according to the embodiment of the present invention are shown in FIG. 13, where "x" is the current pixel to be predicted, $I_k$ denotes a pixel value of a pixel with a mark number of k. A formula for calculating the gradient estimates in the horizontal direction is shown by Formula (1):

$$d_h = |I_1 - I_5| + |I_3 - I_2| + |I_3 - I_4| \tag{1}$$

A formula for calculating the gradient estimates in the vertical direction is shown by Formula (2):

$$d_v = |I_1 - I_2| + |I_3 - I_6| + |I_4 - I_7| \tag{2}$$

A formula for calculating the prediction value of the current pixel is shown by Formula (3), where, constants are empirical values.

$$\hat{x} = \begin{cases} I_1, & \text{if } d_v - d_h > 80 \\ I_3, & \text{else if } d_v - d_h > -80 \\ (6I_1 + 2I_3 + I_4 - I_2)/8, & \text{else if } d_v - d_h > 32 \\ (10I_1 + 6I_3 + 3I_4 - 3I_2)/16, & \text{else if } d_v - d_h > 8 \\ (2I_1 + 6I_3 + I_4 - I_2)/8, & \text{else if } d_v - d_h < -32 \\ (6I_1 + 10I_3 + 3I_4 - 3I_2)/16, & \text{else if } d_v - d_h < 8 \\ (2I_1 + 2I_3 + I_4 - I_2)/4, & \text{else} \end{cases} \tag{3}$$

In one example, an intraframe encoding framework based on template matching is used, in which case because a resampling process is introduced before encoding, the encoding process is performed by performing coding tree unit (CTU) division on the resampled image; the number of encoded pixels needed by the 21-point template is relatively larger, and as a result, only after three rows of CTU and three columns of CTU are encoded, the 21-point template can be entirely the pixel values after reconstruction. A similar problem also exists in the gradient adaptive prediction method. A case where portions of 7 pixels are pixel values after reconstruction in FIG. 13 should also be subjected to a flexible process. In one example, the case is processed by adjusting a threshold value and by using a special case handling process. Firstly, the existing number of 3 gradients of the horizontal gradients and the existing number of gradients of the vertical gradients are counted. Then, the constant in Formula (2) is respective multiplied by gradient coefficients in the horizontal direction and the vertical direction obtained by deriving ratios of the existing numbers to 3, where, the first, the third and the fourth cases in Formula (2) are multiplied by the gradient coefficients in the horizontal direction, and the second, the fifth and the sixth cases are multiplied by the gradient coefficients in the vertical direction. When only the horizontal gradient or the vertical gradient exists, $I_1$ or $I_3$ is taken as a final prediction value.

According to the embodiment of the present invention, firstly, the pixels in the received image frame are rearranged, then pixel value prediction is performed on the image frame subjected to pixel rearrangement by taking a pixel as a unit, which may avoid error diffusion, improve accuracy of pixel value prediction, so as to improve accuracy of image encoding and improve a decoding effect of the decoding end.

IX. An Embodiment of an Extended Image Encoding Method

The extended image encoding method according to the embodiment of the present invention will be described below with reference to FIG. 14.

Figure 14:
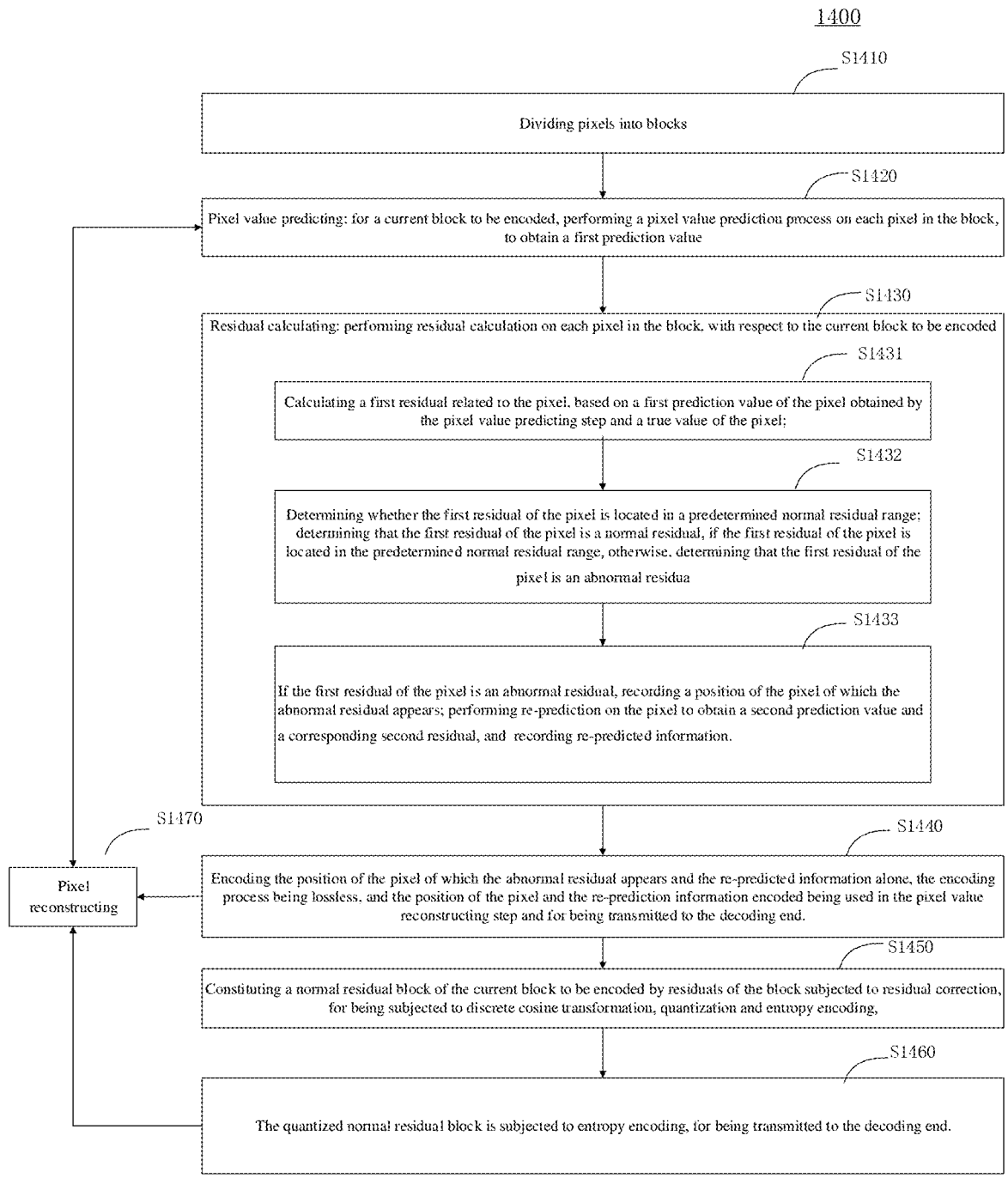
FIG. 14 shows a flow chart of an extended image frame encoding method 2000 according to an embodiment of the present invention.

FIG. 14 shows an overall flow chart of an extended image frame encoding method 1400 according to the embodiment of the present invention. It should be noted that the flow chart is not to be understood as that respective steps are sequentially executed in time in an order of the serial numbers of the respective steps shown in the diagram, for example, with respect to a pixel reconstructing step, for prediction of the current pixel taken as an encoded object, a reconstructed pixel value obtained by reconstructing the previously encoded pixel should be used, so with respect to the current pixel taken as the encoded object, operation of reconstructing the previously encoded pixel should be performed before prediction of the current pixel; and after encoding of a current pixel block is completed, the pixel reconstructing step is performed again, to obtain the reconstructed pixel value of the current pixel, for prediction of the pixel to be encoded subsequently.

As shown in FIG. 14, in step S1410, the pixels are segmented into blocks in a step of pixel segmentation.

In one example, before segmenting the pixel into blocks, the pixels may be rearranged, to obtain respective blocks as encoding targets, so that a plurality of pixels in the block after being segmented into blocks do not appear in an original block in a frame before rearrangement as far as possible, and so that when the pixels in the block are predicted, the pixels in the target template in the frame before rearrangement have been reconstructed as far as possible. In one example, the pixels are rearranged and segmented into blocks, to obtain respective blocks as encoding targets, so that at least some pixels in the block after being segmented into blocks do not appear in the original block in the frame before rearrangement, and so that when the pixels in the block are predicted, at least some pixels in the target template in the frame before rearrangement have been reconstructed.

For the pixel rearranging and block-segmenting method, the pixel rearranging and block-segmenting method as described above in conjunction with FIG. 6 to FIG. 8 may be referred to.

In step S1420, the step of pixel value prediction is performed, and for a current block to be encoded, pixel value prediction process is respectively performed on each pixel in the block, to obtain a first prediction value.

In one example, pixel value prediction may be performed by using the template matching prediction method based on template matching as described above in conjunction with FIG. 1 to FIG. 3 by taking a pixel as a unit, In another example, it is not that a specific pixel prediction algorithm is used routinely, but that before actual execution of pixel prediction, firstly the pixel prediction algorithm is determined, and then prediction is performed by using the determined pixel prediction algorithm.

For example, if the pixels are located on the upper side and on the left side of the rearranged image, a JPEG-LS prediction algorithm is used; otherwise, prediction is performed by using a template matching algorithm. This is because, after experimental statistics, the inventor has found that, generally, with respect to the pixels located on the upper side and on the left side of the image, as compared with pixels located in the middle, on the right side and on the lower side of the image, a predictive effect of the template matching algorithm is poorer.

For another example, the first prediction algorithm used therefor may be determined based on prediction algorithm used for pixels in the block before rearrangement around the pixel to be predicted.

The prediction algorithm may be selected from a set of prediction algorithms below, and the set of prediction algorithms include a template matching algorithm, a weighted template matching algorithm, a JPEG-LS prediction method, a gradient adaptive prediction method. The template matching algorithm may just be the intraframe prediction method based on template matching according to the embodiment of the present invention as described above.

It should be noted that, the prediction algorithm is not limited to the algorithms as listed above, and other algorithms may also be used. For example, the JPEG-LS prediction method is one of the prediction methods based on an image texture, and is a relatively easy one. Other prediction methods based on the image texture may also be used.

Returning to FIG. 14, in step S1430, the performing residual calculation on each pixel in the block with respect to the current block to be encoded, includes: in step S1431, calculating a first residual related to the pixel, based on a first prediction value of the pixel obtained by the step of pixel value prediction and a true value of the pixel; in step S1432, determining whether the first residual of the pixel is a normal residual or an abnormal residual; in step S1433, performing abnormal residual correction, if the first residual of the pixel is an abnormal residual, including: recording a position of a pixel of which the abnormal residual has occurred; re-predicting the pixel to obtain a second prediction value and a corresponding second residual, and recording re-prediction information, wherein, a residual of the pixel of the current block to be encoded which is subjected to abnormal residual correction, constitutes a normal residual block of the current block to be encoded, for being further processed in discrete cosine transform, quantization and entropy encoding.

Based on the position information of the pixel of which the abnormal residual has occurred, the pixel of which the abnormal residual has occurred in the image block may be positioned in the pixel reconstructing step at the encoding end, and based on the re-prediction information and the second residual, the pixel value of the pixel can be reconstructed.

In one example, re-prediction in step S1433 in performed on the pixel by using a prediction algorithm that is different from the first prediction algorithm for obtaining the first prediction value.

In one example, re-prediction in step S1433 may be performed by using a palette method. The palette method is a method for implementing recording a numerical value corresponding to an index by recording the index, which establishes one-to-one corresponding mapping relation between the index and the corresponding numerical value, and the mapping relation is referred to as a palette. A 256-color palette method is used by portable network graphics (PNG) for improving compression efficiency. The palette method is particularly suitable for use in a scenario where there are fewer numerical values. The palette method according to the embodiment of the present invention is referred to in a broad sense, comprising a major-color-based method. By recording the index and the residual in the palette method, the pixel values of the pixels may be reconstructed. For introduction about the palette method, non-patent documents Guo L, Karczewicz M, Sole J, et al. Non-rce3: Modified palette mode for screen content encoding. Document JCTVC-N0249, ITU-T/ISO/IEC Joint Collaborative Team on Video Coding (JCT-VC), July, 2013, and Liwei G, Wei P, Feng Z, et al. Color palette for screen content encoding. Image Processing (ICIP), 2014 IEEE International Conference on. 5556, 5560. as well as Guo X, Li B, Xu J Z, et al. AHG8: Major-color-based screen content encoding. Document JCTVC-O0182, ITU-T/ISO/IEC Joint Collaborative Team on Video Coding (JCT-VC), November, 2013. may be referred to.

It should be noted that, the re-prediction method here is not limited to the palette method, and other prediction methods may also be used. In one embodiment, for each pixel of which the abnormal residual has occurred, respective prediction methods as candidates may be tested, a prediction method of optimal performance may be selected as the re-prediction method, and an identifier of the re-prediction method and other information required for reconstructing the pixel value are recorded as re-prediction information, so that the pixel value of the pixel may be reconstructed based on the re-prediction information and the corresponding residual.

In one example, in a case where a palette prediction method is used, the re-prediction information may include a prediction method identifier (for example, a serial number of the palette prediction method is 1, then the prediction method is identified as 1), and a palette index number (for example, an index number 01 indicates black).

In another example, in a case where an image texture-based prediction method is used, the re-prediction information may include a prediction method identifier (for example, a serial number of the image texture-based prediction method is 2, then the prediction method is identified as 2), and a prediction method serial number (for example, a serial number 02 indicates a JPEG-LS prediction method).

With respect to the method for determining whether the first residual of the pixel is a normal residual or an abnormal residual in step S1432, in one example, an empirically determined normal residual threshold value may be used; if the first residual is less than or equal to the normal residual threshold value, then the first residual is a normal residual, otherwise, it is an abnormal residual; in another example, the normal residual threshold value may be determined by using a rate-distortion optimization (RDO) selection strategy. In the RDO method, a compromised selection between a code rate and distortion is made, to ensure that combination of quality and a code rate of the decoded video image is optimized. For example, within a residual value range, in a case where a threshold value candidate is selected at a predetermined interval, and the threshold value candidate as a normal residual threshold value is tested, with respect to a specified re-prediction algorithm, in average, a situation of the code rate and distortion of encoding the abnormal residual is evaluated, then a next threshold value candidate is tested in an ascending manner, until tests of all the threshold value candidates are completed, and finally, a threshold value candidate whose combination of the code rate and distortion is optimal is selected as a finally determined normal residual threshold value.

Returning to FIG. 14, in step S1440, the position of the pixel of which the abnormal residual has occurred and the re-prediction information are encoded separately, the encoding process is lossless, and the position of the pixel and the re-prediction information encoded are used in the pixel value reconstruction step and for being transmitted to the decoding end. It should be noted that the position of the pixel of which the abnormal residual has occurred and the re-prediction information are not subjected to the discrete cosine transform and quantization step, so as to prevent occurrence of information loss, which results in inability to correctly locate the position of the pixel of which the abnormal residual has occurred and inability to re-predict.

In one example, the lossless encoding performed on the position of the pixel of which the abnormal residual has occurred is executed by using one of algorithms below: shortest path position encoding, single near neighbor position reference encoding, and tetrad near neighbor position reference encoding.

Figure 15:
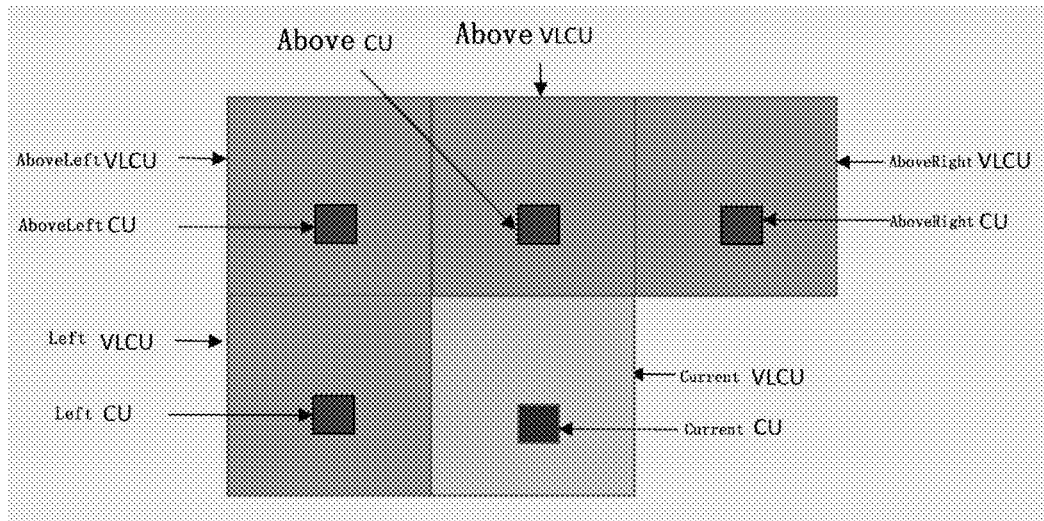
FIG. 15 shows a schematic diagram of positional relationship between an adjacent encoding unit CU and a currently encoded CU under a rearrangement and segment framework according to an embodiment of the present invention.

Hereinafter, the shortest path position encoding, the single near neighbor position reference encoding, and the tetrad near neighbor position reference encoding for encoding the position of the abnormal residual according to the embodiment of the present invention are introduced. It should be noted that, these three encoding methods may be used for encoding all non-zero residuals, rather than being limited to encoding the position of the abnormal residual. The pixels in the image according to the embodiment of the present invention are rearranged and segmented into blocks, and in order to distinguish from a largest encoding unit (LCU) in standard high efficiency video coding (HEVC), the encoding unit under a frame subjected to rearrangement and block division according to the embodiment of the present invention is referred to as a VirtualLargestCodingUnit (VLCU), and positional relationship between an "adjacent" CU and the current encoded CU is shown in FIG. 15. In the shortest path position encoding method, compression efficiency is increased by reducing the code rate used in position information of the abnormal residual of the current CU in the VLCU. In the single near neighbor position reference encoding method and the tetrad near neighbor position reference encoding method, an objective of decreasing the bit rate is achieved by predicting the current CU position with position information of the abnormal residual of the adjacent CU.

For the shortest path position encoding, it is necessary to use a concept of "encoding distance". Similar to distance concepts such as sum of absolute difference (SAD) and sum of square errors (SSE), the encoding distance is the number of bits required for zero-order index based Columbus encoding. Formula (4) gives a definition of the "encoding distance".

$$G_d = \text{ExpGolomb}(Xc-Xp) + \text{ExpGolomb}(Yc-Yp) \quad (4)$$

Where, ExpGolomb (.) is the number of bits used when the zero-order index based Columbus encoding is used, (X, Y) is coordinates of a two-dimensional coordinate system, and c and p are pixels at different positions.

A shortest path in the shortest path position encoding is to deem rearrangement of the position information of the pixel of which the abnormal residual has occurred in the CU as a "path", so as to ensure that a total "encoding distance" of the path is the shortest. In order to reduce position information, by minimizing the "encoding distance", that is, recording the smallest number of bits in the current position, the position information is converted to difference from a previous position.

The shortest path position encoding method uses only the position information of the abnormal residual of the current encoding unit CU. The shortest path position encoding method rearranges the pixels of the abnormal residual with the "encoding distance", and then reduces the number of bits required for recording the position information by recording difference between position information. A position of a first abnormal residual is a position of a point where the "encoding distance" is the smallest to a coordinate origin. All positions that are not encoded are sequenced according to the distance, to select a position closest to previous encoded position information. The zero-order index based Columbus encoding is used for all position information of the shortest path position encoding method.

Figure 16:
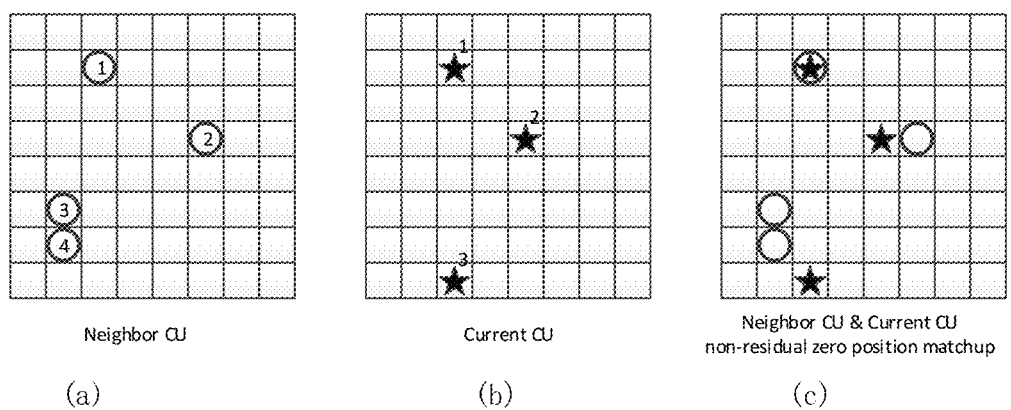
FIGS. 16(a), (b) and (c) respectively show a near neighbor CU, a current CU, and abnormal residual position relation pairing of the near neighbor CU and the current CU.

Hereinafter, the single near neighbor position reference encoding method and the tetrad near neighbor position reference encoding method according to the embodiment of the present invention are described. A pixel of a currently encoded CU and a "near neighbor" CU in the VLCU have adjacent relation in the original image, while the abnormal residual in the current CU is a pixel with a poor effect in the template matching prediction method; in consideration that a feature of the adjacent pixel will be used in the template matching prediction method, if the point in the current CU cannot be well predicted, then there is great probability that its "adjacent" four CUs cannot be well predicted; as shown in FIG. 16. The single near neighbor position reference encoding method and the tetrad near neighbor position reference encoding method according to the embodiment of the present invention take advantage of this point, to reduce the code rate of the position information of the current CU.

The single near neighbor position reference encoding method reduces the position information of the current CU by using the position information of the "adjacent" CU of which the abnormal residual has occurred. In the four CUs corresponding to four VLCU near neighbors thereof which are on the left side, on the upper side, on the upper left side, and on the upper right side currently adjacent thereto, an optimal near neighbor CU is selected by the RDO. In the single near neighbor position reference encoding method, two additional bits are needed for recording a position of the optimal "adjacent" CU. In the method, firstly, the abnormal residual position information of a single "adjacent" CU is sequenced according to the encoding distance in the shortest path position encoding method. The position information of the current CU of which the abnormal residual has occurred is segmented into three portions: an index in the "adjacent" CU array after sequencing, difference of an X axis, and difference of a Y axis. In this way, the abnormal residual of the current CU becomes a triad including the above-described three portions. In order to utilize a feature that the index in the triad is no less than zero, the indexes in the entire triad are sequenced in an ascending order. In order to further reduce correlation of index values in the triad, except an index in a first triad, the index value after sequencing is subtracted by an index value of a previous position to obtain difference in the index value.

A rate-distortion optimization RDO process of variable length encoding and direct encoding is performed respectively on index difference of the triad, the difference of the X axis, and the difference of the Y axis. At this time, because distortion is invariant, it is only necessary to select a method in which the smallest number of bits is used. The difference of the X axis and the difference of the Y axis are taken as a whole, three bits are needed for recording the selection of performing variable length encoding and sequential encoding directly in an order after sequencing on the triad. Variable length encoding is used respectively for three portions of the triad. Variable length encoding respectively records a length of a recurring element and a recurring element value.

The single near neighbor position reference encoding method selects the four "near neighbor" CUs according to the number of bits after encoding the triad. It should be noted that, it is only necessary to encode serial numbers of the "near neighbor" CU with the smallest number of bits after encoding. Because firstly ascending sequencing is performed on the index, it ensures that index difference is larger than or equal to zero. An ending flag of the index difference is set to −1. At the time of encoding, a length of the entire triad may be obtained by firstly encoding the index difference. In addition, respective elements in the triad have a same length, and a length value of other elements is the same as the length value of the index difference. With respect to elements of other triads, it is not necessary to set an ending flag separately; with respect to the single near neighbor position reference encoding method, it is only necessary to set the ending flag of the index difference, so that the ending flag of other elements in the single near neighbor position reference encoding method can be identified.

Figure 17:
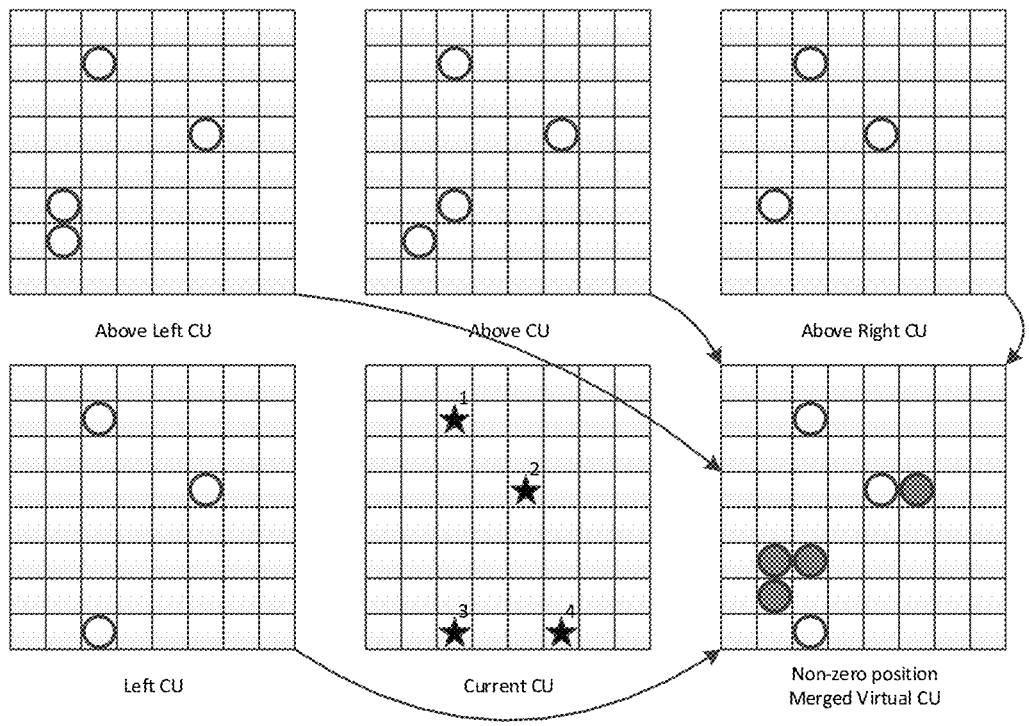
FIG. 17 schematically shows a merging process of a virtual encoding unit.

The tetrad near neighbor position reference encoding method reduces the code rate, by using the four CUs on the left side, on the upper side, on the upper left side, and on the upper right side adjacent thereto for combining into position information of a virtual CU, and a combination process of the virtual CU is shown in FIG. 17. There are three cases where the position of the abnormal residual in the virtual CU and the position of the currently encoded CU. In a first case, the position of the abnormal residual point in the virtual CU coincides with the position of the current CU; in a second case, what is in the virtual CU is not an abnormal residual, but what is in the current encoded CU is an abnormal residual; in a third case, what is in the current encoded CU is an abnormal residual, but what is in the virtual CU is not an abnormal residual. The tetrad near neighbor position reference encoding method performs encoding on the above-described cases respectively. With respect to the first case and the third case, in a processing order from left to right, from top to bottom, only if there is abnormal residual in the virtual CU, encoding is performed; and under the first case, encoding is performed on the abnormal residual which has occurred in the corresponding position of the current CU, and under the third case, encoding is performed on zero in the corresponding position of the current CU. With respect to the second case where the abnormal residual has occurred in the current CU, encoding is performed by using the shortest path position encoding method.

When encoding is performed with respect to the first case and the third case, because the virtual CU in the decoding end and the encoding end is consistent, it is not necessary to set the encoding ending flag. And a tetrad near neighbor position reference encoding method of a chrominance component may also perform encoding with different references. The tetrad near neighbor position reference encoding method of the chrominance component is different from a tetrad near neighbor position reference encoding method of a luminance component, and the latter may perform encoding directly with a luminance component of the current CU as reference position information.

Returning to FIG. 14, in step S1450, the residual of the pixel of the current block to be encoded which is subjected to abnormal residual correction, constitutes a normal residual block of the current block to be encoded, and then it is subjected to discrete cosine transform and quantization. The quantized residual block is used for being transmitted to a pixel reconstructing module, and for being transmitted to an entropy encoding module.

It should be noted that, the so-called "normal residual block" does not indicate that all the residuals in the residual block are normal residuals. In some cases, there may be a few residuals which are still abnormal residuals, for example, there may be a very small number of pixels of which the abnormal residual has occurred, and after re-prediction, although the second residual obtained thereby is improved to a certain extent, it is still an abnormal residual; or, a case cannot be excluded that after re-prediction, the second residual obtained thereby is not superior to the first residual, and with respect to the case, the first residual may still be selected as a pixel residual, without identifying the pixel as one of which the abnormal residual has occurred. In all of these cases, the corrected residual blocks are all referred to as "normal residual blocks".

In step S1460, the quantized normal residual block is subjected to entropy encoding, for being transmitted to the decoding end, Entropy encoding compresses various syntax elements generated in a programming process based on a probability model. Entropy encoding includes Huffman encoding and arithmetic encoding. In one example, entropy encoding according to the embodiment of the present invention uses context-adaptive binary arithmetic coding (CABAC).

In step S1470, the pixel value reconstruction step is performed, to reconstruct the pixel value of the previously encoded pixel, and the reconstructed pixel value is used for the step of pixel value prediction.

In one example, the pixel value reconstruction step includes: obtaining a normal residual block constituted by normal residuals of the pixel, by inverse quantization and inverse discrete cosine transform of the quantized normal residual block; decoding to obtain the position of the pixel of which the abnormal residual has occurred and the re-prediction information with respect to the pixel of which the abnormal residual has occurred, and reconstructing the pixel values of the respective pixels in the image block, based on the normal residual block obtained, the position of the pixel of which the abnormal residual has occurred and the re-prediction information, as well as the first prediction value of the pixel in the corresponding image block. In one example, the reconstructing the pixel values of the respective pixels in the image block, based on the normal residual obtained, the position of the pixel of which the abnormal residual has occurred and the re-prediction information, as well as the first prediction value of the pixel in the corresponding image block includes: with respect to the pixel where the abnormal residual has not occurred, obtaining the first residual of the pixel and the first prediction value of the pixel, based on the normal residual block obtained, and constructing the pixel value of the pixel; with respect to the pixel where the abnormal residual has occurred, obtaining the second prediction value based on the re-prediction information, and obtaining the second residual based on the normal residual block obtained, and reconstructing the pixel value of the pixel based on the second residual and the second prediction value.

According to the embodiment of the present invention, the normal residual is obtained by re-predicting the pixel where the abnormal residual has occurred, which is able to sufficiently utilize the transform, quantization and entropy encoding method of high efficiency video coding (HEVC), to perform loss encoding. Thus, it is possible to combine the advantage of avoiding error diffusion brought about by pixel rearrangement and division into blocks and prediction by taking a pixel as a u nit, and the advantage of high efficiency brought about by transform, quantization, and entropy encoding. The entropy encoding method according to the embodiment of the present invention is particularly suitable for screen image encoding.

X. An Embodiment of an Extended Image Decoding Method

According to another embodiment of the present invention, there is provided a decoding method for decoding an image frame, which may comprise: receiving encoded representation of an image block; in one example, the image block may be formed by rearranging and segmenting the pixels within the image before encoding into blocks; obtaining normal residuals of the respective pixels in the image block, by decoding, inverse quantization and inverse discrete cosine transform, with respect to the encoded representation; receiving a position of a pixel where an abnormal residual has occurred and re-prediction information subjected to lossless encoding, and decoding the same; respectively performing a first prediction process on each pixel in the image block, to obtain a first prediction value of the pixel; determining pixel values of respective pixels, based on the normal residuals of the respective pixels, the position of the pixel of which the abnormal residual has occurred and the re-prediction information, and the first prediction value of the pixel.

In one example, the image is rearranged on an encoding end, and the decoding method may further comprise: recovering an original image that is not rearranged according to a rule of image rearrangement.

In one example, the performing a first prediction process on each pixel in the image block, to obtain a first prediction value of the pixel may include: determining a prediction algorithm used for the pixel and/or a parameter of the prediction algorithm; and predicting the value of the pixel by using a first prediction algorithm. In a traditional technology, prediction is performed by taking a block as a unit, all pixels in the block are predicted by a same prediction method; for example, they are all predicted by using a same prediction direction. However, the method according to the embodiment of the present invention may be used for performing different predictions in a personalized manner, with respect to different pixel positions and different surrounding pixels; for example, for some pixels, the template matching prediction method is used, and for some pixels, the JPEG-LS prediction method is used; and even if a same prediction method is used, different parameters may still be used; even if they all use the template matching prediction method, different templates may still be used.

In one example, the determining a first prediction algorithm used for the pixel includes: determining the first prediction algorithm used for the pixel, based on a prediction algorithm used for the surrounding pixels of the pixel in the block before rearrangement.

In one example, the first prediction algorithm is selected from one of: a template matching algorithm, a weighted template matching algorithm, a JPEG-LS prediction method, and a gradient adaptive prediction method.

In one example, the determining a first prediction algorithm used for the pixel in the pixel value prediction process may include: the first prediction algorithm used therefor being JPEG-LS, if the pixel is in the upper left corner of the block before rearrangement, otherwise, the first prediction algorithm used therefor being the template matching algorithm.

In one example, the determining a first prediction algorithm used for the pixel in the pixel value prediction process may include: the first prediction algorithm used therefor being JPEG-LS, if the pixel is located on the left side or on the upper side in the block before rearrangement, otherwise, the first prediction algorithm used therefor being the template matching algorithm.

In one example, the determining pixel values of the respective pixels, based on the residuals of the respective pixels obtained, the position of the pixel of which the abnormal residual has occurred and the re-prediction information, and the first prediction value of the pixel, may include: with respect to the pixel where the abnormal residual has not occurred, determining the pixel value of the pixel, based on the residual obtained, and the first prediction value of the pixel; with respect to the pixel where the abnormal residual has occurred, obtaining the second prediction value based on the re-prediction information, and determining the pixel value of the pixel, based on the residual obtained and the second prediction value.

XI. An Embodiment of an Extended Image Encoder

Figure 18:
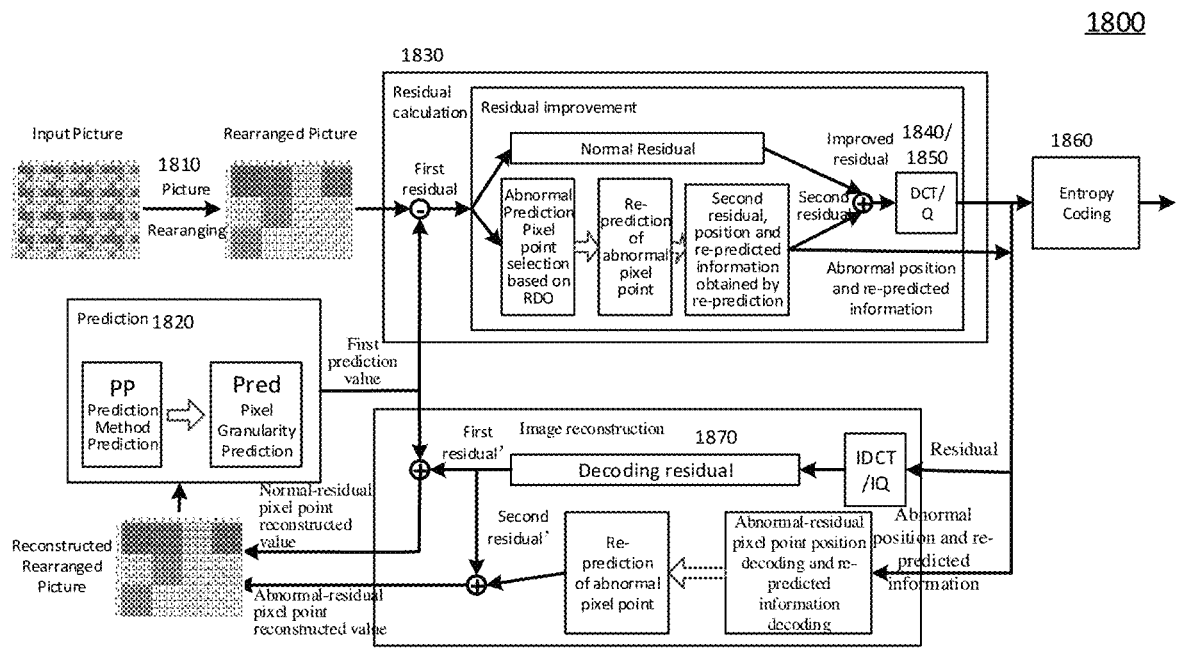
FIG. 18 shows a structural schematic diagram of an extended image encoder 1800 according to an embodiment of the present invention.

The extended image encoder according to the embodiment of the present invention will be described below with reference to FIG. 18. FIG. 18 shows a structural schematic diagram of an extended image encoder 1800 according to the embodiment of the present invention.

As shown in FIG. 18, the encoder 1800 for performing intraframe encoding on an image, may comprise: a pixel block-segmenting unit 1810, a pixel value predicting unit 1820, a residual calculating unit 1830, a discrete cosine transforming unit 1840, and a quantizer 1850, an entropy encoder 1860 and a pixel value reconstructing unit 1870.

The pixel block-segmenting unit 1810 is used for segmenting pixels into blocks. In an example shown in FIG. 18, pixel block-segmenting unit 1810 further rearranges the pixels before segmenting the pixels into blocks. For the pixel rearrangement method, forgoing description in conjunction with FIG. 6 to FIG. 8 may be referred to.

The pixel value predicting unit 1820 is used for respectively performing a pixel value prediction process on each pixel in a block, with respect to a current block to be encoded, to obtain a first prediction value. In an example shown in FIG. 18, the pixel value predicting unit 1820, before performing pixel prediction, firstly determines (or predicts) a prediction algorithm of the pixel prediction (PP). For the pixel prediction algorithm and the method for determining (or predicting) the pixel prediction algorithm, forgoing description of step S1420 in conjunction with FIG. 14 may be referred to.

The residual calculating unit 1830 is used for respectively performing a pixel value prediction process to obtain a first prediction value for each of pixels in a current block to be encoded. For the specific residual calculation method and implementation, description of step S1430 in conjunction with FIG. 14 may be referred to. In an example shown in FIG. 18, firstly a first residual related to the pixel is calculated based on a first prediction value of the pixel obtained by the step of pixel value prediction and a true value of the pixel. Then, abnormal pixel selection is performed based on rate-distortion optimization (RDO), to select a pixel of which the abnormal residual has occurred, then abnormal residual correction is performed, including re-predicting the abnormal pixel to obtain a second prediction value and a corresponding second residual, and recording the position and re-prediction information. In a preferred example, the second residual is made as a normal residual as far as possible, but as described above, a case is not excluded that a very small number of second residuals obtained after re-prediction of the previous pixels of which the abnormal residual has occurred are still abnormal residuals or the second residual is inferior to the first residual. The second residual obtained thereby and the first residual which is determined as the normal residual are combined so as to obtain a corrected residual as a normal residual block, such a normal residual block is subjected to discrete cosine transform performed by the discrete cosine transform unit 1840, and quantization performed by the quantizer 1850, and a result after discrete cosine transform and quantization in this way is output to the entropy encoder 1860 and output to the pixel value reconstructing unit 1870. In addition, the residual calculating unit 1830 separately encodes the position of which the abnormal residual has occurred and the re-prediction information obtained thereby, and the encoding process is lossless. Then the pixel position and the re-prediction information separately encoded are transmitted to the pixel value reconstructing unit 1870 and a decoder end; in one example, before transmitted to the decoder end, the pixel position and the re-prediction information separately encoded are firstly subjected to entropy encoding, and then transmitted to the decoder end.

As described above, the discrete cosine transforming unit 1840, the quantizer 1850, and the entropy encoder 1860 are used for respectively performing discrete cosine transform, quantization, and entropy encoding on the residual blocks corresponding to the current block to be encoded.

The pixel value reconstructing unit 1870 is used for reconstructing the pixel value of the previously encoded pixel, which, on the one hand, receives the residual subjected to discrete cosine transform and quantization, performs inverse quantization and inverse discrete cosine transform on it and decodes to obtain a corrected residual (the symbol "‿" which has occurred here and after indicates what is obtained by decoding, instead of an original value), the corrected residual ‿ is segmented into a first residual ‿ and a second residual ‿, wherein, the pixel value of the pixel of the normal residual is obtained by the first residual ‿ and the first prediction value; the pixel value reconstructing unit predicts the value to obtain the pixel value of the pixel of the normal residual; on the other hand, the pixel value reconstructing unit receives the pixel position of the abnormal residual and the re-prediction information separately encoded, decodes it, and performs re-prediction on the pixel, to obtain a second prediction value ‿, and then obtains the pixel value of the pixel of the abnormal residual with the second residual ˍ and a second prediction value ˍ, so as to implement pixel reconstruction.

The above-described image encoder according to the embodiment, divides the pixel residual into the normal residual and the abnormal residual, and performs re-prediction on the pixel of the abnormal residual, so that the second residual is a normal residual or is closer to the normal residual, so that more accurate image encoding may be obtained.

XII. An Embodiment of an Extended Image Decoder

Figure 19:
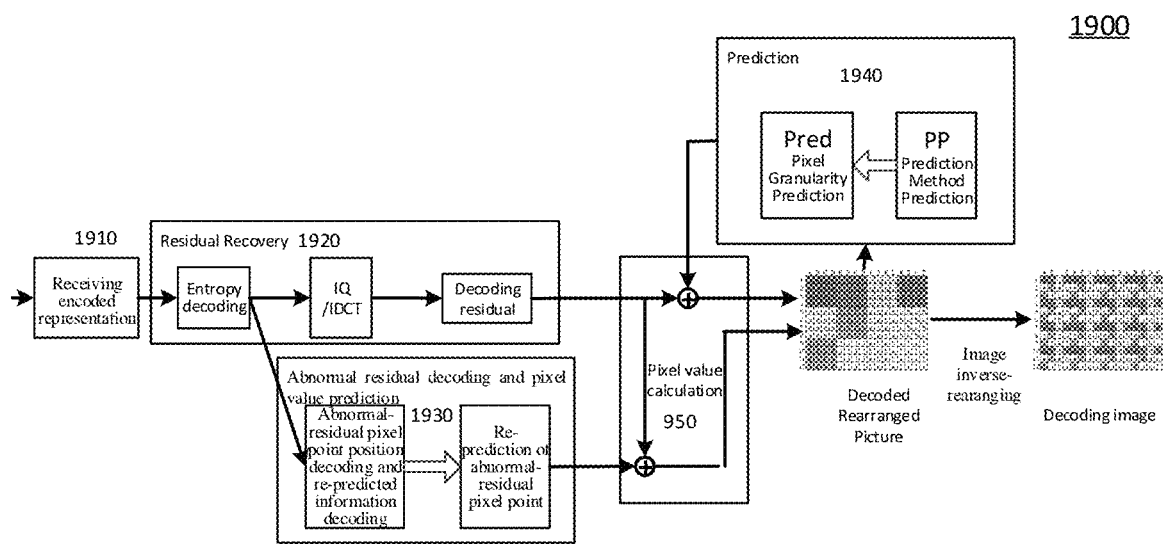
FIG. 19 shows a structural schematic diagram of an extended image decoder 1900 according to an embodiment of the present invention.

The extended image decoder according to the embodiment of the present invention will be described below with reference to FIG. 19. FIG. 19 shows a structural schematic diagram of an extended image decoder 1900 according to the embodiment of the present invention.

As shown in FIG. 19, the decoder 1900 may comprise: an image block encoded representation receiving unit 1910, for receiving encoded representation of an image block, and a residual recovery unit 1920, for obtaining residuals of the respective pixels in the image block, by entropy decoding, inverse quantization and inverse discrete cosine transform, with respect to the encoded representation; an abnormal residual decoding and pixel value predicting unit 1930, for receiving a position of a pixel where an abnormal residual has occurred and re-prediction information subjected to lossless encoding, decoding the same, and performing re-prediction to obtain a second prediction value ˍ; a predicting unit 1940, for respectively performing a first prediction process on each pixel in the image block, to obtain a first prediction value ˍ, of the pixel; a pixel value calculating unit 1950, for determining pixel values of respective pixels, based on normal residuals of the respective pixels obtained, the position of the pixel of which the abnormal residual has occurred and the re-prediction information, and the first prediction value ˍ of the pixel. In an example shown in FIG. 19, the predicting unit 1940 predicts a prediction method of pixel predication, and performs pixel value prediction by using the pixel predication method obtained by prediction, to obtain the first prediction value of the pixel. In an example shown in FIG. 19, on the one hand, the pixel value calculating unit 1950 obtains the pixel value of the pixel of the normal residual from the first residual ˍ in the residuals obtained by recovery performed by the residual recovery unit 1920, and the first prediction value ˍ of the pixel obtained by the predicting unit 1940; on the other hand, it obtains the pixel value of the pixel of the abnormal residual from the second residual ˍ in the residuals obtained by recovery performed by the residual recovery unit 1920, and the second prediction value ˍ of the pixel obtained by the abnormal residual decoding and pixel value predicting unit 1930.

In one example, the image block is formed by pixels after rearranging pixels and segmenting the pixels into blocks in an image before being encoded, and the decoder further includes an anti-recombining unit, for recovering an original image having not been subjected to rearrangement, according to a rule of image arrangement.

It should be noted that respective components of the image encoder, the image encoding method, and the image decoder, and the image decoding method as described above may be realized by software programs, e.g. realized through combination of a CPU in a general-purpose computer with an RAM, an ROM and software codes running in the CPU. The software programs may be stored in a storage medium such as a flash memory, a soft disk, a hard disk or an optical disk, and are loaded to the random access memory (RAM) during running and executed by the CPU. In addition, besides the general-purpose computer, they may also be realized through the cooperation between an application-specific integrated circuit and software. The integrated circuit is realized through at least one of an MPU (micro processing unit), a DSP (digital signal processor), an FPGA (field-programmable gate array), an ASIC (application-specific integrated circuit) and the like. In addition, each component of the image encoders may be realized by special hardware, e.g. a specific Field Programmable Gate Array, an Application-Specific Integrated Circuit and the like. In addition, each component of the image encoders may further be realized via the combination of software and hardware.

The structure and number of each component of the image encoders do not limit the scope of the present invention. According to an embodiment of the present invention, the components may be combined into an independent component to execute and realize corresponding functions and operations, or each component is further split into smaller units to realize their respective functions and operations.

The embodiments of the present invention are described above, and the foregoing descriptions are exemplary rather than exhaustive and are not limited to the disclosed embodiments. Many modifications and alterations are obvious to those ordinary skilled in the art without departing from the scope and spirit of each described embodiment. Accordingly, the protection scope of the claims should prevail over the protection scope of the present invention.

The invention claimed is:

1. An intraframe pixel prediction method for performing prediction on a pixel within an image, comprising:
   a pixel rearranging step of rearranging pixels within an image frame; and
   a step of pixel value prediction of performing prediction on pixel values of respective pixels rearranged by taking a pixel as a unit,
   wherein, the step of pixel value prediction includes:
      when predicting each pixel,
         determining a prediction algorithm used for the pixel and/or a parameter of the prediction algorithm; and
         predicting the value of the pixel by using the prediction algorithm, and wherein, the prediction algorithm used therefor is determined according to a position of the pixel in the rearranged image.

2. The intraframe pixel prediction method according to claim 1, wherein, the determining a prediction algorithm used for the pixel includes:
   determining the prediction algorithm used therefor based on prediction algorithm used for pixels in the image before rearrangement around the pixel.

3. The intraframe pixel prediction method according to claim 1, wherein, the determining a prediction algorithm used for the pixel includes:
   the first prediction algorithm used therefor being JPEG-LS, if the pixel is located on the upper side or the left side in the rearranged image, otherwise, the first prediction algorithm used therefor being the template matching algorithm.

4. The intraframe pixel prediction method according to claim 1, wherein, the prediction algorithm is selected from one of:
   a template matching algorithm, a weighted template matching algorithm, a JPEG-LS prediction method, and a gradient adaptive prediction method.

5. The intraframe pixel prediction method according to claim 1, further comprising:
   a step of pixel segmentation of segmenting the rearranged pixels into blocks; and
   the step of pixel value prediction of respectively performing pixel value prediction process on each pixel in a block, by using a template matching method, to obtain a first prediction value, including:
      a target template obtaining step of obtaining the target template of a current pixel to be predicted;
      a matching template determining step of comparing the target template with a candidate template of a search region of the frame, and determining at least one matching template in the candidate templates that matches the target template; and
      determining, based on the at least one matching template, the prediction value of the pixel.

6. The intraframe pixel prediction method according to claim 5, further comprising:
   a matching index table constructing step of extracting a template feature with respect to a target template of a pixel value of which has been predicted, and constructing a Hash Table,
   wherein, the matching template determining step includes extracting the feature of the target template, and locating the template matching the target template in the Hash Table based on the extracted feature.

7. The intraframe pixel prediction method according to claim 6, wherein, the extracting the template feature includes segmenting the template into subgroups, obtaining pixel representation values of respective subgroups, and taking the pixel representation values of the respective subgroups as the feature of the template.

8. The intraframe pixel prediction method according to claim 7, wherein, with respect to a target template of one pixel, the number of pixels within a subgroup closer to the pixel is smaller than the number of pixels within a subgroup farther away from the pixel.

9. The intraframe pixel prediction method according to claim 8, wherein, the pixel representation values of the respective subgroups are average values of pixels of the subgroups.

10. The intraframe pixel prediction method according to claim 6, wherein, a target template of a pixel X includes 21 pixels, which are respectively, three pixels on the left side of the pixel X, and three rows of pixels immediately on the upper side of the pixel, each of the three rows of pixels having 6 pixels, which are respectively three pixels on the left side of the pixel X, one pixel on the upper side of the pixel and two pixels on the right side of the pixel X, wherein, each of the three pixels immediately adjacent to the pixel X is a subgroup, two pixels on the leftmost side of a same row of the pixel X and two immediately adjacent pixels respectively on the upper side of the two pixels constitute one subgroup, two pixels on the rightmost side of a row prior to the row where the pixel X is located constitute one subgroup, and four pixels of each two rows above the row where the pixel X is located, among two non-adjacent rows in an order from left to right constitute one subgroup, so as to constitute eight subgroups, and the pixel representation values of the eight subgroups are taken as the template feature.

11. The intraframe pixel prediction method according to claim 6, further comprising:
   constructing a new node based on the target template and adding it to the Hash Table, if no template that matches the target template is located in the Hash Table.

12. A computer program product comprising a non-transitory computer readable medium having instructions recorded thereon, the instructions when executed by a computer implementing an intraframe pixel prediction method, comprising:
   a pixel rearranging step of rearranging pixels within an image frame; and
   a step of pixel value prediction of performing prediction on pixel values of respective pixels rearranged by taking a pixel as a unit,
   wherein, the step of pixel value prediction includes:
      when predicting each pixel,
      determining a prediction algorithm used for the pixel and/or a parameter of the prediction algorithm; and
      predicting the value of the pixel by using the prediction algorithm, and wherein, the prediction algorithm used therefor is determined according to a position of the pixel in the rearranged image.

13. The computer program according to claim 12, wherein, the determining a prediction algorithm used for the pixel includes:
   determining the prediction algorithm used therefor based on prediction algorithm used for pixels in the image before rearrangement around the pixel.

14. The computer program according to claim 12, wherein, the determining a prediction algorithm used for the pixel includes:
   the first prediction algorithm used therefor being JPEG-LS, if the pixel is located on the upper side or the left side in the rearranged image, otherwise, the first prediction algorithm used therefor being the template matching algorithm.

15. The intraframe pixel prediction method according to claim 12, wherein, the prediction algorithm is selected from one of:
   a template matching algorithm, a weighted template matching algorithm, a JPEG-LS prediction method, and a gradient adaptive prediction method.

16. The intraframe pixel prediction method according to claim 12, further comprising:
   a step of pixel segmentation of segmenting the rearranged pixels into blocks; and
   the step of pixel value prediction of respectively performing pixel value prediction process on each pixel in a block, by using a template matching method, to obtain a first prediction value, including:
      a target template obtaining step of obtaining the target template of a current pixel to be predicted;
      a matching template determining step of comparing the target template with a candidate template of a search region of the frame, and determining at least one matching template in the candidate templates that matches the target template; and
   determining, based on the at least one matching template, the prediction value of the pixel.

* * * * *